US008380659B2

(12) United States Patent
Zunger

(10) Patent No.: US 8,380,659 B2
(45) Date of Patent: Feb. 19, 2013

(54) METHOD AND SYSTEM FOR EFFICIENTLY REPLICATING DATA IN NON-RELATIONAL DATABASES

(75) Inventor: Yonatan Zunger, Mountain View, CA (US)

(73) Assignee: Google Inc., Mountain View, CA (US)

( * ) Notice: Subject to any disclaimer, the term of this patent is extended or adjusted under 35 U.S.C. 154(b) by 88 days.

(21) Appl. No.: 12/703,167

(22) Filed: Feb. 9, 2010

(65) Prior Publication Data
US 2011/0196827 A1    Aug. 11, 2011

(51) Int. Cl.
*G06F 7/00*    (2006.01)
(52) U.S. Cl. .......................... 707/609; 707/625
(58) Field of Classification Search ........................ None
See application file for complete search history.

(56) References Cited

U.S. PATENT DOCUMENTS

| | | | |
|---|---|---|---|
| 6,167,427 A | 12/2000 | Rabinovich et al. | |
| 6,728,751 B1 | 4/2004 | Cato et al. | |
| 6,857,012 B2 | 2/2005 | Sim et al. | |
| 7,107,419 B1 | 9/2006 | Ghemawat et al. | |
| 7,251,670 B1 | 7/2007 | Day | |
| 7,293,154 B1 | 11/2007 | Karr et al. | |
| 7,320,059 B1 | 1/2008 | Armangau et al. | |
| 7,450,503 B1 | 11/2008 | Ginjpalli et al. | |
| 7,558,927 B2 | 7/2009 | Clark et al. | |
| 7,567,973 B1 | 7/2009 | Burrows et al. | |
| 7,647,329 B1 | 1/2010 | Fischman et al. | |
| 7,653,668 B1 | 1/2010 | Shelat et al. | |
| 7,660,836 B2 | 2/2010 | Bolik et al. | |
| 7,716,171 B2 | 5/2010 | Kryger | |
| 7,761,678 B1 | 7/2010 | Bodmer et al. |
| 7,778,972 B1 | 8/2010 | Cormie et al. |
| 7,778,984 B2 | 8/2010 | Zhang et al. |
| 7,885,928 B2 | 2/2011 | Harrington et al. |
| 8,010,514 B2 | 8/2011 | Zhang et al. |
| 8,099,388 B2 | 1/2012 | Shen et al. |
| 2002/0147774 A1 | 10/2002 | Lisiecki et al. |

(Continued)

FOREIGN PATENT DOCUMENTS

EP      1 860 542 A2    11/2007

OTHER PUBLICATIONS

Google Inc., PCT/US2011/024246, Feb. 9, 2011, International Search Report and Written Opinion mailed Apr. 26, 2011, 9 pgs.

(Continued)

*Primary Examiner* — Hung Q Pham
(74) *Attorney, Agent, or Firm* — Morgan, Lewis & Bockius LLP

(57) ABSTRACT

A method replicates data between instances of a distributed database. The method identifies at least two instances of the database at distinct geographic locations. The method tracks changes to the database by storing deltas. Each delta has a row identifier that identifies the piece of data modified, a sequence identifier that specifies the order in which the deltas are applied to the data, and an instance identifier that specifies where the delta was created. The method determines which deltas to send using an egress map that specifies which combinations of row identifier and sequence identifier have been acknowledged as received at other instances. The method builds a transmission matrix that identifies deltas that have not yet been acknowledged as received. The method then transmits deltas identified in the transmission matrix. After receiving acknowledgement that transmitted deltas have been incorporated into databases at other instances, the method updates the egress map.

13 Claims, 21 Drawing Sheets

U.S. PATENT DOCUMENTS

| | | |
|---|---|---|
| 2003/0149709 A1* | 8/2003 | Banks .......................... 707/200 |
| 2004/0199810 A1 | 10/2004 | Tarcea et al. |
| 2005/0198359 A1 | 9/2005 | Basani et al. |
| 2006/0026219 A1 | 2/2006 | Orenstein et al. |
| 2006/0112140 A1 | 5/2006 | McBride et al. |
| 2006/0221190 A1 | 10/2006 | Limberis et al. |
| 2007/0050415 A1 | 3/2007 | Armangau et al. |
| 2007/0078901 A1 | 4/2007 | Satou et al. |
| 2007/0156842 A1 | 7/2007 | Vermeulen et al. |
| 2007/0203910 A1 | 8/2007 | Ferguson et al. |
| 2007/0283017 A1 | 12/2007 | Anand et al. |
| 2008/0027884 A1 | 1/2008 | Boutault |
| 2008/0147821 A1 | 6/2008 | Dietrich et al. |
| 2009/0083342 A1 | 3/2009 | Tomic et al. |
| 2009/0083563 A1 | 3/2009 | Murase |
| 2009/0228532 A1 | 9/2009 | Anzai |
| 2009/0240664 A1 | 9/2009 | Dinker et al. |
| 2009/0265519 A1 | 10/2009 | Moore et al. |
| 2009/0271412 A1 | 10/2009 | Lacapra et al. |
| 2009/0276408 A1 | 11/2009 | Auerbach et al. |
| 2009/0327602 A1 | 12/2009 | Moore et al. |
| 2010/0017037 A1 | 1/2010 | Nam et al. |
| 2010/0094981 A1 | 4/2010 | Cordray et al. |
| 2010/0138495 A1 | 6/2010 | McIntyre et al. |
| 2010/0189262 A1 | 7/2010 | Ducharme et al. |
| 2010/0325476 A1 | 12/2010 | Zhang et al. |
| 2011/0185013 A1 | 7/2011 | Obata et al. |
| 2011/0238625 A1 | 9/2011 | Hamaguchi et al. |

OTHER PUBLICATIONS

Google Inc., PCT/US2011/024247, Feb. 9, 2011, International Search Report and Written Opinion mailed Sep. 23, 2011, 15 pgs.

Google Inc., PCT/US2011/024249, Feb. 9, 2011, International Search Report and Written Opinion mailed Apr. 26, 2011, 10 pgs.

Chang, F. et al., "Bigtable: A Distributed Storage System for Structured Data," OSDI, 2006, 14 pages.

Ghemawat, S. et al., "The Google File System," SOSP '03, Oct. 19-22, 2003, 15 pages.

Korn, D. et al. "The VCDIFF Generic Differencing and Compression Data Format," Standard Track, Jun. 2002, 29 pages.

Google Code, "Protocol Buffers, Language Guide," http://code.google.com/apis/protocolbuffers/docs/proto.html, 2011, 16 pages.

Barrett, How Index Building Works, Google Code, Nov. 24, 2008, 3 pgs.

* cited by examiner

Server Allocation

| Task / Function | Typical Number of Servers at an Instance |
|---|---|
| Blobmaster | 10 |
| Bitpusher | 100 |
| BigTable Servers | 50 |
| File System Servers | 1000 |
| Tape Servers | 10 |
| Tape Master | 5 |
| Replication Management | 10 |
| Quorum Clock Server | 5 |

Egress Map 134
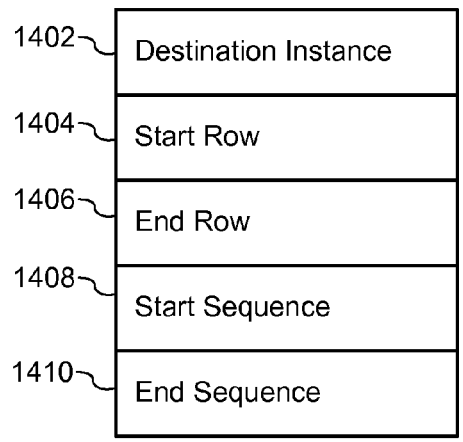
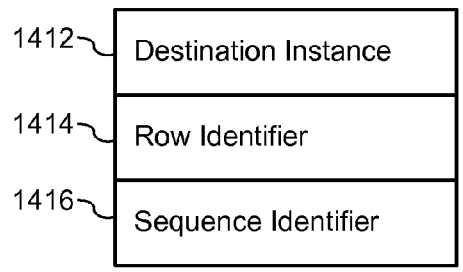
Figure 14A    Figure 14B
Ingress Map 136
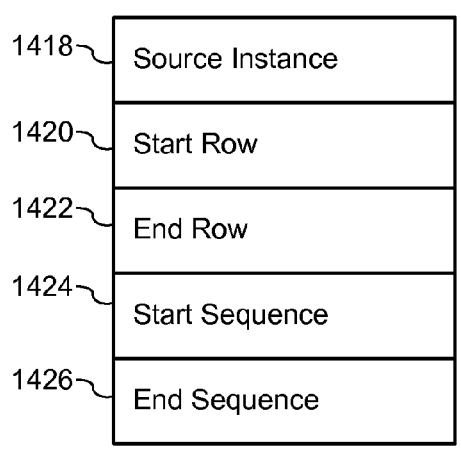
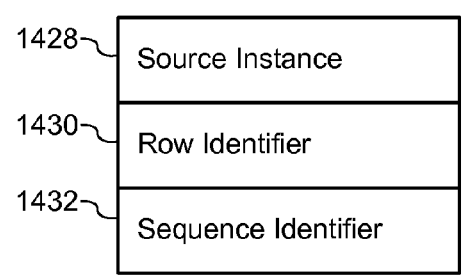
Figure 14C    Figure 14D

Original Transmission Plan

Revised Transmission Plan

Alternative Revised Transmission Plans

METHOD AND SYSTEM FOR EFFICIENTLY REPLICATING DATA IN NON-RELATIONAL DATABASES

RELATED APPLICATIONS

This application is related to the following applications:
(1) U.S. Provisional Patent Application Ser. No. 61/302,904, filed Feb. 9, 2010subsequently filed as U.S. patent application Ser. No. 13/023,384, filed Feb. 8, 2011;
(2) U.S. Provisional Patent Application Ser No. 61/302,894, filed Feb. 9, 2010, subsequently filed as U.S. patent application Ser. No. 13/022,551, filed Feb. 7, 2011;
(3) U.S. Provisional Patent Application Ser. No. 61/302,908, filed Feb. 9, 2010,subsequently filed as U.S. patent application Ser. No. 13/022,564, filed Feb. 7, 2011;
(4) U.S. Provisional Patent Application Ser. No. 61/302,930, filed Feb. 9, 2010,subsequently filed as U.S. patent application Ser. No. 13/023,503, filed Feb. 8, 2011;
(5) U.S. Provisional Patent Application Ser. No. 61/302,896, filed Feb. 9, 2010, subsequently filed as U.S. patent application Ser. No. 13/022,579, filed Feb. 7, 2011
(6) U.S. Provisional Patent Application Ser. No. 61/302,936, filed Feb. 9, 2010, subsequently filed as U.S. patent application Ser. No. 13/022,290 ,filed Feb. 7, 2011;
(7) U.S. Provisional Patent Application Ser. No. 61/302,909, filed Feb. 9, 2010, subsequently filed as U.S. patent application Ser. No. 13/023,498, filed Feb. 8, 2011; and
(8) U.S. Provisional Patent Application Ser. No. 61/302,918, filed Feb. 9, 2010, subsequently filed as U.S patent application Ser. No. 13/024,250, filed Feb. 9, 2011.
Each of these related applications references are incorporated herein by reference in their entirety.

TECHNICAL FIELD

The disclosed embodiments relate generally to database replication, and more specifically to replication of data in weakly mutable distributed databases.

BACKGROUND

For weakly mutable data, changes or mutations at one instance (or replica) of the data must ultimately replicate to all other instances of the database, but there is no strict time limit on when the updates must occur. This is an appropriate model for certain data that does not change often, particular when there are many instances of the database at locations distributed around the globe.

Replication of large quantities of data on a planetary scale can be both slow and inefficient. In particular, the long-haul network paths have limited bandwidth. In general, a single change to a large piece of data entails transmitting that large piece of data through the limited bandwidth of the network. Furthermore, the same large piece of data is transmitted to each of the database instances, which multiplies the bandwidth usage by the number of database instances.

In addition, network paths and data centers sometimes fail or become unavailable for periods of time (both unexpected outages as well as planned outages for upgrades, etc.). Generally, replicated systems do not handle such outages gracefully, often requiring manual intervention. When replication is based on a static network topology and certain links become unavailable or more limited, replication strategies based on the original static network may be inefficient or ineffective.

SUMMARY

The above deficiencies and other problems associated with replicating data for a distributed database to multiple replicas across a widespread distributed system are addressed by the disclosed embodiments. In some of the disclosed embodiments, changes to an individual piece of data are tracked as deltas, and the deltas are transmitted to other instances of the database rather than transmitting the piece of data itself. In some embodiments, reading the data includes reading both an underlying value and any subsequent deltas, and thus a client reading the data sees the updated value even if the deltas has not been incorporated into the underlying data value. In some embodiments, distribution of the data to other instances takes advantage of the network tree structure to reduce the amount of data transmitted across the long-haul links in the network. For example, data that needs to be transmitted from Los Angeles to both Paris and Frankfurt could be transmitted to Paris, with a subsequent transmission from Paris to Frankfurt.

In accordance with some embodiments, a computer-implemented method executes at one or more server computers, each having one or more processors and memory. The memory stores one or more programs for execution by the one or more processors on each server computer. The method replicates data between a plurality of instances of a distributed database. The method identifies a first instance of the distributed database at a first geographic location, and identifies a second instance of the distributed database at a second geographic location. The method tracks changes to the distributed database at the first instance by storing deltas. Each delta has a row identifier that identifies the piece of data modified, a sequence identifier that specifies the order in which the deltas are applied to the data, and an instance identifier that specifies the instance where the delta was created. The method determines which deltas to send to the second instance using an egress map at the first instance. The egress map specifies which combinations of row identifier and sequence identifier have been acknowledged as received at the second instance. The method builds a transmission matrix for the second instance that identifies deltas that have not yet been acknowledged as received at the second instance. The method then transmits deltas identified in the transmission matrix to the second instance. After receiving acknowledgement that transmitted deltas have been incorporated in the second instance, the method updates the egress map to indicate acknowledged deltas.

In accordance with some embodiments, the computer-implemented method for replicating data from a distributed database includes identifying a third instance of the distributed database at a third geographic location distinct from the first and second geographic locations. In some embodiments, the method determines which deltas to send to the third instance using a third egress map at the first instance, wherein the third egress map specifies which combinations of row identifier and sequence identifier have been acknowledged as received at the third instance. In some embodiments, the method builds a third transmission matrix for the third instance that identifies deltas that have not yet been acknowledged as received at the third instance. In some embodiments, the method modifies the transmission matrices for the second and third instances to form one or more revised transmission matrices. The deltas identified in each revised transmission matrix are transmitted to a respective location to update the instance at the respective location. Deltas identified in at least one of the revised transmission matrices are transmitted to the second location for subsequent transmission from the second location to the third location. In some embodiments, the method receives acknowledgement that deltas transmitted to the third instance, either directly or indirectly via the second instance, have been incorporated in the third instance, and then updates the third egress map to indicate acknowledged deltas.

In accordance with some embodiments, a method executes at one or more servers to compact data in a distributed database having a plurality of instances. Each instance stores data on one or more server computers, each having memory and one or more processors. The method identifies a first instance of the distributed database at a first geographic location. The method selects a set of one or more row identifiers that identify rows of data in the distributed database. Each row in the distributed database has a base value and a set of zero or more deltas. Each delta specifies a change to the base value, includes a sequence identifier that specifies the order in which the deltas are to be applied to the base value, and specifies the instance where the delta was created. The method selects a compaction horizon for the selected set of one or more row identifiers, where the compaction horizon is a sequence identifier. The method applies, in sequence, all deltas for the selected set of one or more row identifiers that have sequence identifiers less than or equal to the compaction horizon, to the base value for the corresponding row identifier. The method also deletes the deltas that have been applied to the base value for the corresponding row identifier.

In some embodiments of a method for compacting data in a distributed database, the method identifies a plurality of other instances of the distributed database. In some embodiments, the selected compaction horizon for the selected set of one or more row identifiers satisfies: (1) all deltas that (i) were created at the first instance; (ii) are for rows corresponding to row identifiers in the selected set of one or more rows identifier; and (iii) have sequence identifiers less than or equal to the compaction horizon; have been transmitted to and acknowledged by all of the other instances that maintain data for the corresponding row identifiers; and (2) all deltas that (i) were created at instances in the plurality of other instances; (ii) are for rows corresponding to row identifiers in the selected set of one or more row identifiers; and (iii) have sequence identifiers less than or equal to the compaction horizon; have been received at the first instance.

In accordance with some embodiments, a computer-implemented method executes at one or more servers to read a data item from a distributed database with a plurality of data rows. Each row comprises a base value and zero or more deltas that specify modifications to the base value. The method is performed by one or more server computers having memory and one or more processors. The method receives a request from a client for a specified data item, and the request includes a row identifier. The method reads the base value for the specified data item from the distributed database and stores the base value in memory. The method also reads the deltas for the specified data item, if any, from the distributed database. Each delta includes a sequence identifier that specifies the order in which the deltas are to be applied to the base value. The method applies the deltas to the base value in memory, in sequence, resulting in a current base value stored in memory. The method returns the current base value stored in memory to the client.

Thus methods and systems are provided that make replication of data in distributed databases faster, and enable more efficient use of network resources. Faster replication results in providing users with updated information (or access to information) more quickly; and more efficient usage of network bandwidth leaves more bandwidth available for other tasks, making other processes run faster.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

FIGS. 14A-14D illustrate skeletal data structures for egress and ingress maps according to some embodiments.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

DESCRIPTION OF EMBODIMENTS

Figure 1A:
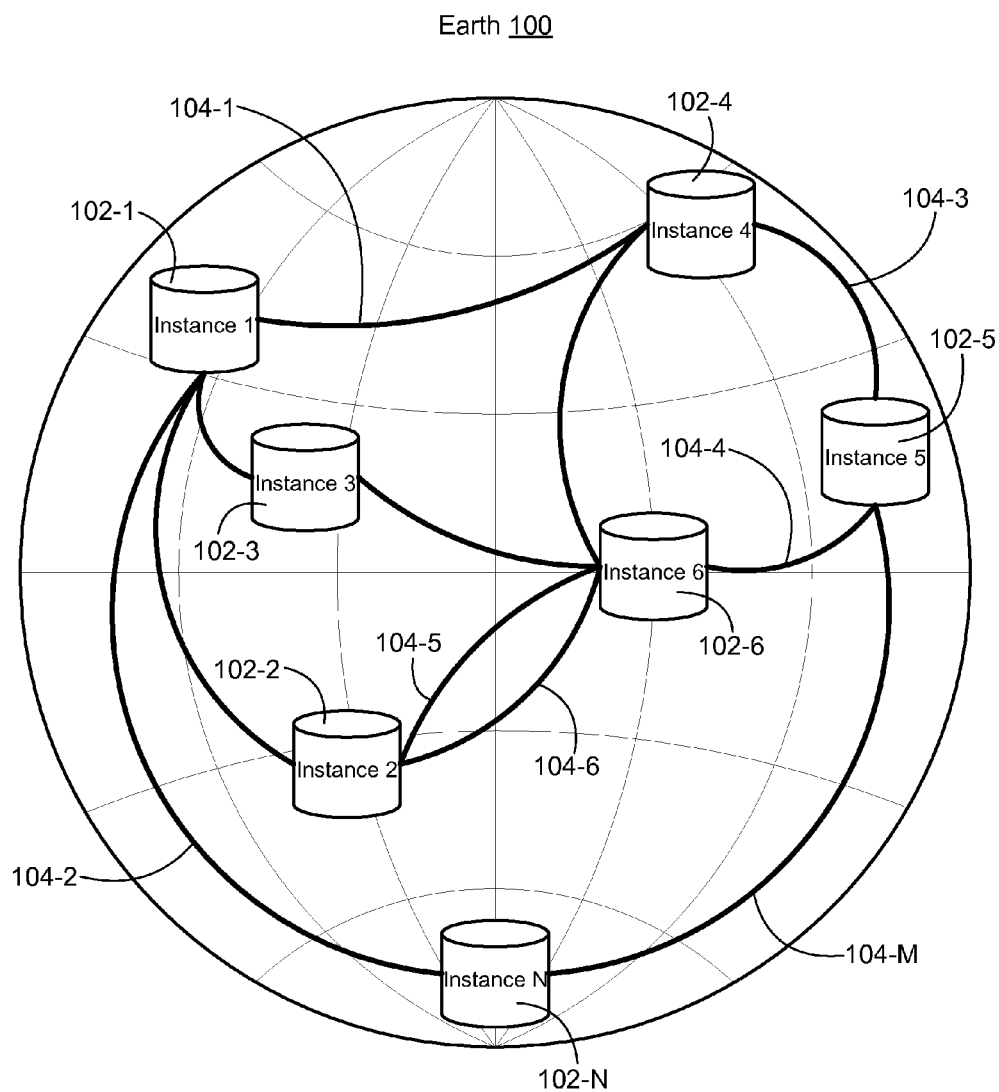
FIG. 1A is a conceptual illustration for placing multiple instances of a database at physical sites all over the globe according to some embodiments.
Figure 2:
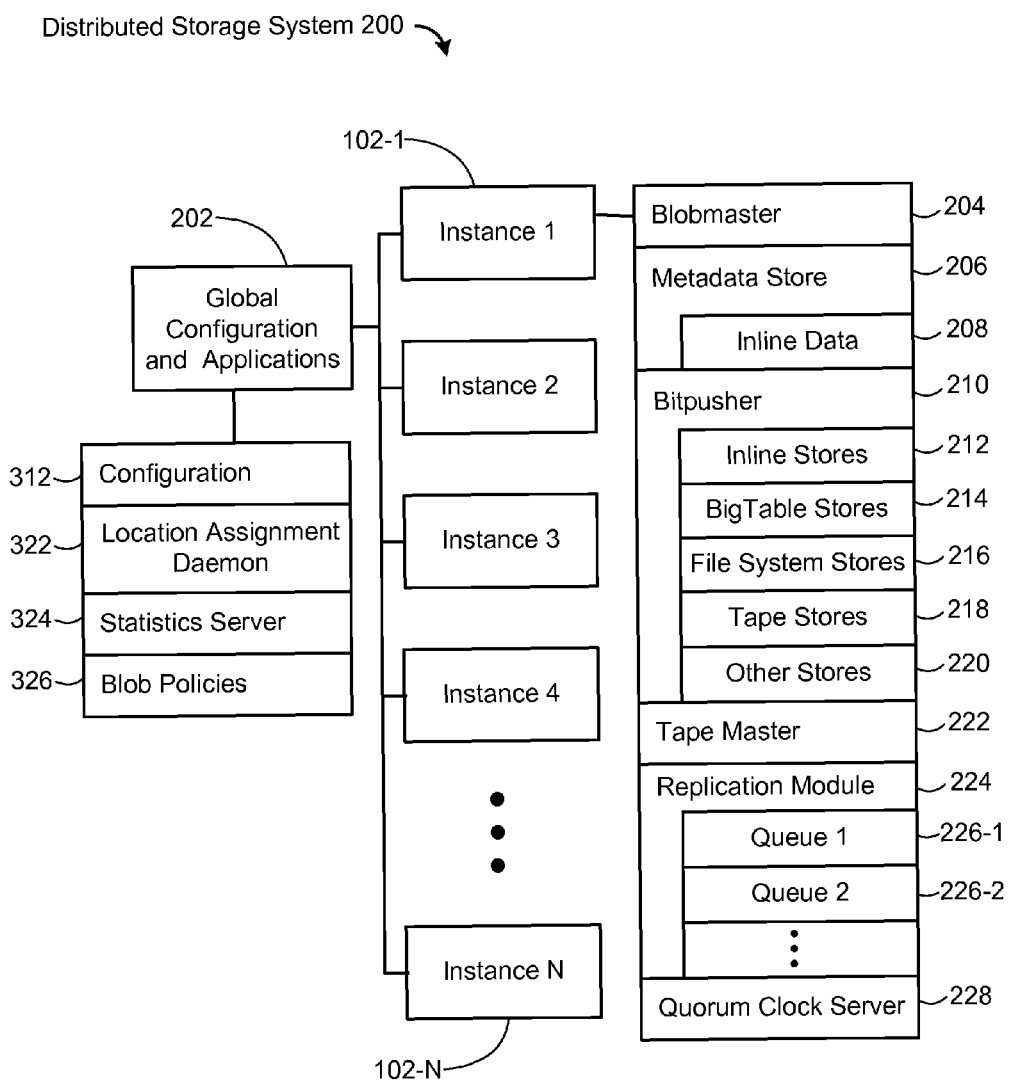
FIG. 2 is a block diagram illustrating multiple instances of a replicated database, with an exemplary set of programs and/or processes shown for the first instance according to some embodiments.
Figure 3:
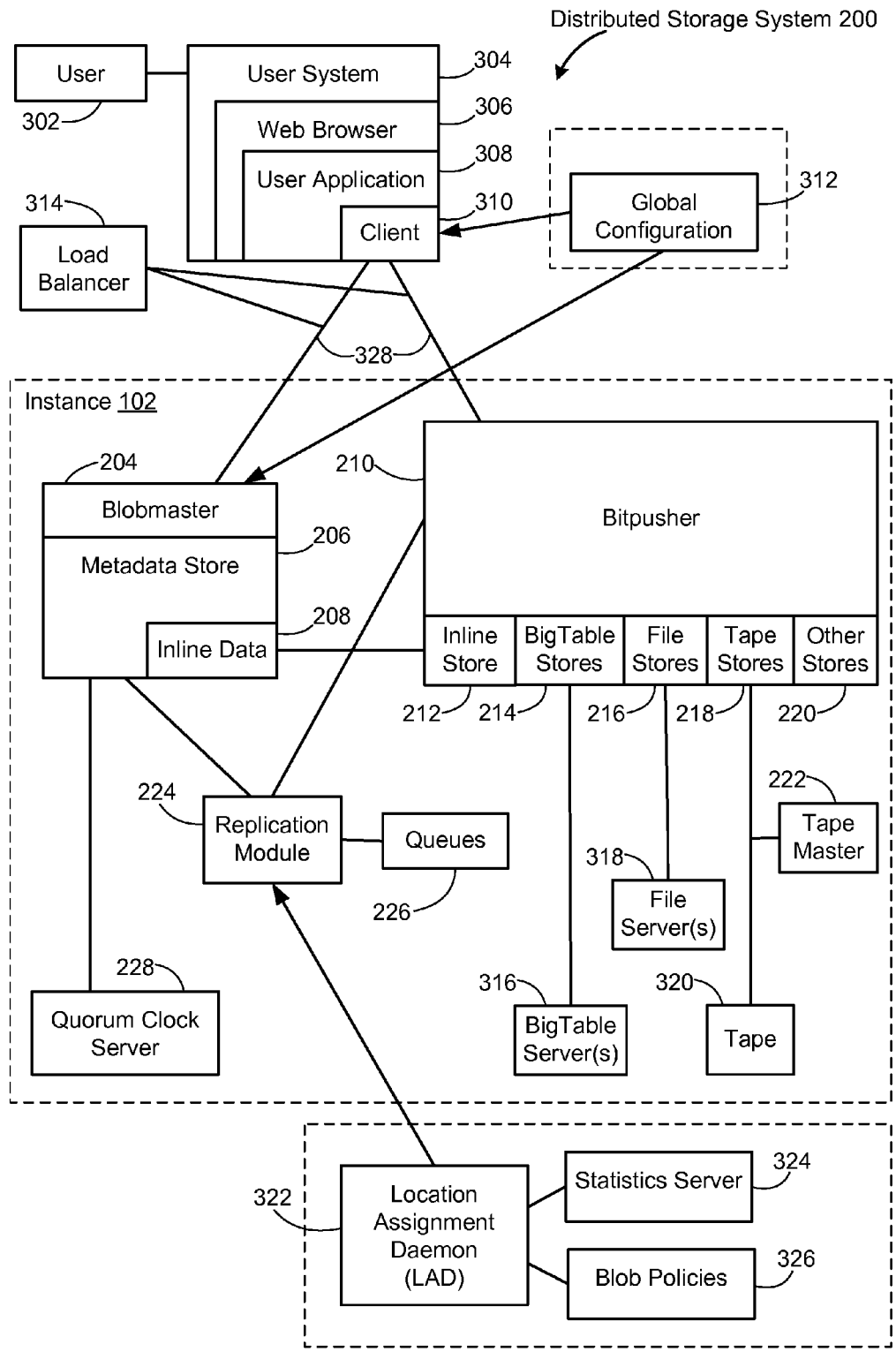
FIG. 3 is a block diagram that illustrates an exemplary instance for the system, and illustrates what blocks within the instance a user interacts with according to some embodiments.

As illustrated in FIG. 1A, the disclosed embodiments describe a planet-scale distributed storage system. There are a plurality of instances 102-1, 102-2, . . . 102-N at various locations on the Earth 100, connected by network communication links 104-1, 104-2, . . . 104-M. In some embodiments, an instance (such as instance 102-1) corresponds to a data center. In other embodiments, multiple instances are physically located at the same data center. Although the conceptual diagram of FIG. 1 shows a limited number of network communication links 104-1, etc., typical embodiments would have many more network communication links. In some embodiments, there are two or more network communication links between the same pair of instances, as illustrated by links 104-5 and 104-6 between instance 2 (102-2) and instance 6 (102-6). In some embodiments, the network communication links are composed of fiber optic cable. In some embodiments, some of the network communication links use wireless technology, such as microwaves. In some embodiments, each network communication link has a specified bandwidth and/or a specified cost for the use of that bandwidth. In some embodiments, statistics are maintained about the transfer of data across one or more of the network communication links, including throughput rate, times of availability, reliability of the links, etc. Each instance typically has data stores and associated databases (as shown in FIGS. 2 and 3), and utilizes a farm of server computers ("instance servers," see FIG. 4) to perform all of the tasks. In some embodiments, there are one or more instances that have limited functionality, such as acting as a repeater for data transmissions between other instances. Limited functionality instances may or may not have any of the data stores depicted in FIGS. 3 and 4.

Figure 1B:
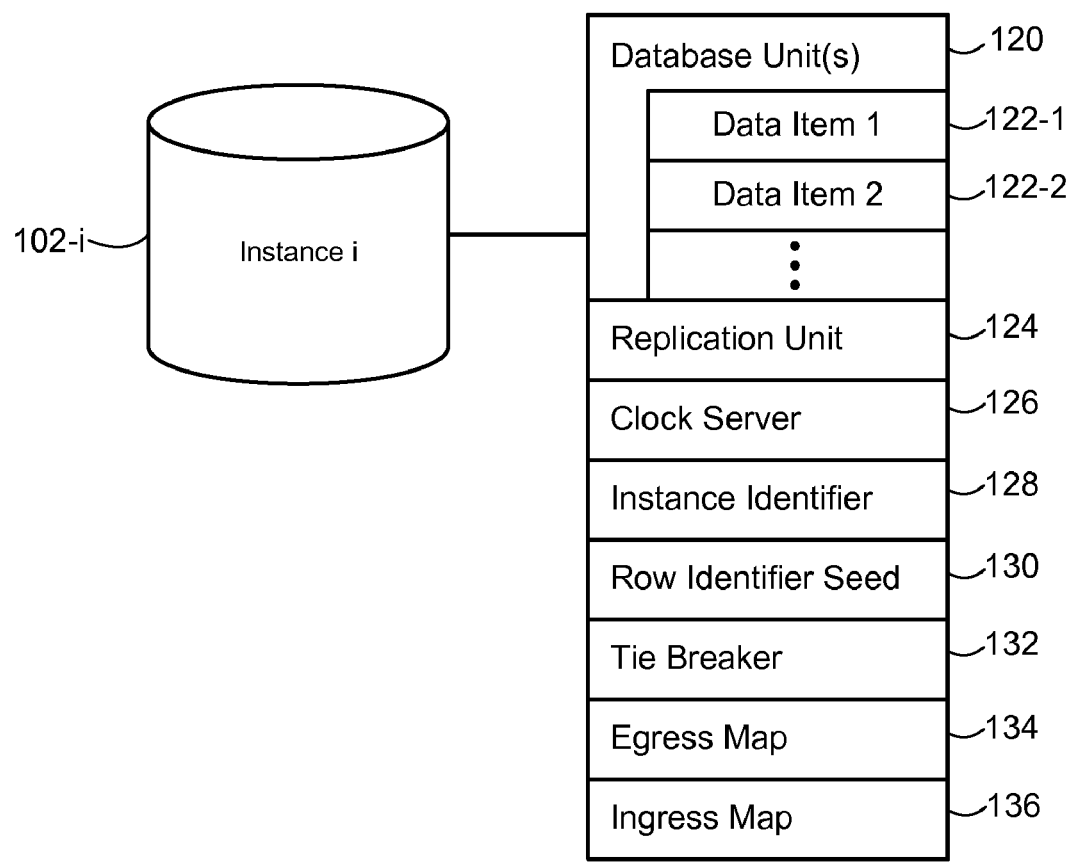
FIG. 1B illustrates basic functionality at each instance according to some embodiments.

FIG. 1B illustrates data and programs at an instance 102-i that store and replicate data between instances. The underlying data items 122-1, 122-2, etc. are stored and managed by one or more database units 120. Each instance 102-i has a replication unit 124 that replicates data to and from other instances. The replication unit 124 also manages one or more egress maps 134 that track data sent to and acknowledged by other instances. Similarly, the replication unit 124 manages one or more ingress maps, which track data received at the instance from other instances. Egress maps and ingress maps are described in more detail below with respect to FIGS. 14A-14D, 15A, and 17.

Each instance 102-i has one or more clock servers 126 that provide accurate time. In some embodiments, the clock servers 126 provide time as the number of microseconds past a well-defined point in the past. In preferred embodiments, the clock servers provide time readings that are guaranteed to be monotonically increasing. In some embodiments, each instance server 102-i stores an instance identifier 128 that uniquely identifies itself within the distributed storage system. The instance identifier may be saved in any convenient format, such as a 32-bit integer, a 64-bit integer, or a fixed length character string. In some embodiments, the instance identifier is incorporated (directly or indirectly) into other unique identifiers generated at the instance. In some embodiments, an instance 102-i stores a row identifier seed 130, which is used when new data items 122 are inserted into the database. A row identifier is used to uniquely identify each data item 122. In some embodiments, the row identifier seed is used to create a row identifier, and simultaneously incremented, so that the next row identifier will be greater. In other embodiments, unique row identifiers are created from a timestamp provided by the clock servers 126, without the use of a row identifier seed. In some embodiments, a tie breaker value 132 is used when generating row identifiers or unique identifiers for data changes (described below with respect to FIGS. 6-9). In some embodiments, a tie breaker 132 is stored permanently in non-volatile memory (such as a magnetic or optical disk).

The elements described in FIG. 1B are incorporated in embodiments of the distributed storage system 200 illustrated in FIGS. 2 and 3. In some embodiments, the functionality described in FIG. 1B is included in a blobmaster 204 and metadata store 206. In these embodiments, the primary data storage (i.e., blobs) is in the data stores 212, 214, 216, 218, and 220, and managed by bitpushers 210. The metadata for the blobs is in the metadata store 206, and managed by the blobmaster 204. The metadata corresponds to the functionality identified in FIG. 1B. Although the metadata for storage of blobs provides an exemplary embodiment of the present invention, one of ordinary skill in the art would recognize that the present invention is not limited to this embodiment.

The distributed storage system 200 shown in FIGS. 2 and 3 includes certain global applications and configuration information 202, as well as a plurality of instances 102-1, . . . 102-N. In some embodiments, the global configuration information includes a list of instances and information about each instance. In some embodiments, the information for each instance includes: the set of storage nodes (data stores) at the instance; the state information, which in some embodiments includes whether the metadata at the instance is global or local; and network addresses to reach the blobmaster 204 and bitpusher 210 at the instance. In some embodiments, the global configuration information 202 resides at a single physical location, and that information is retrieved as needed. In other embodiments, copies of the global configuration information 202 are stored at multiple locations. In some embodiments, copies of the global configuration information 202 are stored at some or all of the instances. In some embodiments, the global configuration information can only be modified at a single location, and changes are transferred to other locations by one-way replication. In some embodiments, there are certain global applications, such as the location assignment daemon 322 (see FIG. 3) that can only run at one location at any given time. In some embodiments, the global applications run at a selected instance, but in other embodiments, one or more of the global applications runs on a set of servers distinct from the instances. In some embodiments, the location where a global application is running is specified as part of the global configuration information 202, and is subject to change over time.

FIGS. 2 and 3 illustrate an exemplary set of programs, processes, and data that run or exist at each instance, as well as a user system that may access the distributed storage system 200 and some global applications and configuration. In some embodiments, a user 302 interacts with a user system 304, which may be a computer or other device that can run a web browser 306. A user application 308 runs in the web browser, and uses functionality provided by database client 310 to access data stored in the distributed storage system 200 using network 328. Network 328 may be the Internet, a local area network (LAN), a wide area network (WAN), a wireless network (WiFi), a local intranet, or any combination of these. In some embodiments, a load balancer 314 distributes the workload among the instances, so multiple requests issued by a single client 310 need not all go to the same instance. In some embodiments, database client 310 uses information in a global configuration store 312 to identify an appropriate instance for a request. The client uses information from the global configuration store 312 to find the set of blobmasters 204 and bitpushers 210 that are available, and where to contact them. A blobmaster 204 uses a global configuration store 312 to identify the set of peers for all of the replication processes. A bitpusher 210 uses information in a global configuration store 312 to track which stores it is responsible for. In some embodiments, user application 308 runs on the user system 304 without a web browser 306. Exemplary user applications are an email application and an online video application.

In some embodiments, each instance has a blobmaster 204, which is a program that acts as an external interface to the metadata table 206. For example, an external user application 308 can request metadata corresponding to a specified blob using client 310. In some embodiments, every instance 102 has metadata in its metadata table 206 corresponding to every blob stored anywhere in the distributed storage system 200. In other embodiments, the instances come in two varieties: those with global metadata (for every blob in the distributed storage system 200) and those with only local metadata (only for blobs that are stored at the instance). In particular, blobs typically reside at only a small subset of the instances. The metadata table 206 includes information relevant to each of the blobs, such as which instances have copies of a blob, who has access to a blob, and what type of data store is used at each instance to store a blob. The exemplary data structures in FIGS. 18A-18E illustrate other metadata that is stored in metadata table 206 in some embodiments.

When a client 310 wants to read a blob of data, the blobmaster 204 provides one or more read tokens to the client 310, which the client 310 provides to a bitpusher 210 in order to gain access to the relevant blob. When a client 310 writes data, the client 310 writes to a bitpusher 210. The bitpusher 210 returns write tokens indicating that data has been stored, which the client 310 then provides to the blobmaster 204, in order to attach that data to a blob. A client 310 communicates with a bitpusher 210 over network 328, which may be the same network used to communicate with the blobmaster 204. In preferred embodiments, communication between the client 310 and bitpushers 210 is routed according to a load balancer 314. Because of load balancing or other factors, communication with a blobmaster 204 at one instance may be followed by communication with a bitpusher 210 at a different instance. For example, the first instance may be a global instance with metadata for all of the blobs, but may not have a copy of the desired blob. The metadata for the blob identifies which instances have copies of the desired blob, so in this example the subsequent communication with a bitpusher 210 to read or write is at a different instance.

A bitpusher 210 copies data to and from data stores. In some embodiments, the read and write operations comprise entire blobs. In other embodiments, each blob comprises one or more chunks, and the read and write operations performed by a bitpusher are on solely on chunks. In some of these embodiments, a bitpusher deals only with chunks, and has no knowledge of blobs. In preferred embodiments, a bitpusher has no knowledge of the contents of the data that is read or written, and does not attempt to interpret the contents.

Embodiments of a bitpusher 210 support one or more types of data store. In preferred embodiments, a bitpusher supports a plurality of data store types, including inline data stores 212, BigTable stores 214, file server stores 216, and tape stores 218. Some embodiments support additional other stores 220, or are designed to accommodate other types of data stores as they become available or technologically feasible.

Inline stores 212 actually use storage space 208 in the metadata store 206. Inline stores provide faster access to the data, but have limited capacity, so inline stores are generally for relatively "small" blobs. In some embodiments, inline stores are limited to blobs that are stored as a single chunk. In some embodiments, "small" means blobs that are less than 32 kilobytes. In some embodiments, "small" means blobs that are less than 1 megabyte. As storage technology facilitates greater storage capacity, even blobs that are currently considered large may be "relatively small" compared to other blobs.

BigTable stores 214 store data in BigTables located on one or more BigTable database servers 316. BigTables are described in several publicly available publications, including "Bigtable: A Distributed Storage System for Structured Data," Fay Chang et al, OSDI 2006, which is incorporated herein by reference in its entirety. In preferred embodiments, the BigTable stores save data on a large array of servers 316.

File stores 216 store data on one or more file servers 318. In some embodiments, the file servers use file systems provided by computer operating systems, such as UNIX. In other embodiments, the file servers 318 implement a proprietary file system, such as the Google File System (GFS). GFS is described in multiple publicly available publications, including "The Google File System," Sanjay Ghemawat et al., SOSP'03,Oct. 19-22, 2003, which is incorporated herein by reference in its entirety. In other embodiments, the file servers 318 implement NFS (Network File System) or other publicly available file systems not implemented by a computer operating system. In preferred embodiments, the file system is distributed across many individual servers 318 to reduce risk of loss or unavailability of any individual computer.

Tape stores 218 store data on physical tapes 320. Unlike a tape backup, the tapes here are another form of storage. This is described in greater detail in co-pending U.S. Provisional patent application Ser. No. 61/302,909, filed Feb. 9, 2010, subsequently filed as U.S patent application Ser. No. 13/023, 498, filed Feb. 8, 2011, which is incorporated herein by reference in its entirety. In some embodiments, a Tape Master application 222 assists in reading and writing from tape. In some embodiments, there are two types of tape: those that are physically loaded in a tape device, so that the tapes can be robotically loaded; and those tapes that physically located in a vault or other offline location, and require human action to mount the tapes on a tape device. In some instances, the tapes in the latter category are referred to as deep storage or archived. In some embodiments, a large read/write buffer is used to manage reading and writing data to tape. In some embodiments, this buffer is managed by the tape master application 222. In some embodiments there are separate read buffers and write buffers. In some embodiments, a client 310 cannot directly read or write to a copy of data that is stored on tape. In these embodiments, a client must read a copy of the data from an alternative data source, even if the data must be transmitted over a greater distance.

In some embodiments, there are additional other stores 220 that store data in other formats or using other devices or technology. In some embodiments, bitpushers 210 are designed to accommodate additional storage technologies as they become available.

Each of the data store types has specific characteristics that make them useful for certain purposes. For example, inline stores provide fast access, but use up more expensive limited space. As another example, tape storage is very inexpensive, and provides secure long-term storage, but a client cannot directly read or write to tape. In some embodiments, data is automatically stored in specific data store types based on matching the characteristics of the data to the characteristics of the data stores. In some embodiments, users 302 who create files may specify the type of data store to use. In other embodiments, the type of data store to use is determined by the user application 308 that creates the blobs of data. In some embodiments, a combination of the above selection criteria is used. In some embodiments, each blob is assigned to a storage policy 326, and the storage policy specifies storage properties. A blob policy 326 may specify the number of copies of the blob to save, in what types of data stores the blob should be saved, locations where the copies should be saved, etc. For example, a policy may specify that there should be two copies on disk (Big Table stores or File Stores), one copy on tape, and all three copies at distinct metro locations. In some embodiments, blob policies 326 are stored as part of the global configuration and applications 202.

In some embodiments, each instance 102 has a quorum clock server 228, which comprises one or more servers with internal clocks. The order of events, including metadata deltas 608, is important, so maintenance of a consistent time clock is important. A quorum clock server regularly polls a plurality of independent clocks, and determines if they are reasonably consistent. If the clocks become inconsistent and it is unclear how to resolve the inconsistency, human intervention may be required. The resolution of an inconsistency may depend on the number of clocks used for the quorum and the nature of the inconsistency. For example, if there are five clocks, and only one is inconsistent with the other four, then the consensus of the four is almost certainly right. However, if each of the five clocks has a time that differs significantly from the others, there would be no clear resolution.

In some embodiments, each instance has a replication module 224, which identifies blobs or chunks that will be replicated to other instances. In some embodiments, the replication module 224 may use one or more queues 226-1, 226-2, . . . . Items to be replicated are placed in a queue 226, and the items are replicated when resources are available. In some embodiments, items in a replication queue 226 have assigned priorities, and the highest priority items are replicated as bandwidth becomes available. There are multiple ways that items can be added to a replication queue 226. In some embodiments, items are added to replication queues 226 when blob or chunk data is created or modified. For example, if an end user 302 modifies a blob at instance 1, then the modification needs to be transmitted to all other instances that have copies of the blob. In embodiments that have priorities in the replication queues 226, replication items based on blob content changes have a relatively high priority. In some embodiments, items are added to the replication queues 226 based on a current user request for a blob that is located at a distant instance. For example, if a user in California requests a blob that exists only at an instance in India, an item may be inserted into a replication queue 226 to copy the blob from the instance in India to a local instance in California. That is, since the data has to be copied from the distant location anyway, it may be useful to save the data at a local instance. These dynamic replication requests receive the highest priority because they are responding to current user requests. The dynamic replication process is described in more detail in co-pending U.S. Provisional patent application Ser. No. 61/302,896, filed Feb. 9, 2010, subsequently filed as U.S. patent application Ser. No. 13/022,579, filed Feb. 7, 2011, incorporated herein by reference in its entirety.

In some embodiments, there is a background replication process that creates and deletes copies of blobs based on blob policies 326 and blob access data provided by a statistics server 324. The blob policies specify how many copies of a blob are desired, where the copies should reside, and in what types of data stores the data should be saved. In some embodiments, a policy may specify additional properties, such as the number of generations of a blob to save, or time frames for saving different numbers of copies. E.g., save three copies for the first 30 days after creation, then two copies thereafter. Using blob policies 326, together with statistical information provided by the statistics server 324, a location assignment daemon 322 determines where to create new copies of a blob and what copies may be deleted. When new copies are to be created, records are inserted into a replication queue 226, with the lowest priority. The use of blob policies 326 and the operation of a location assignment daemon 322 are described in more detail in co-pending U.S. Provisional patent application Ser. No. 61/302,936, filed Feb 9, 2010, subsequently filed as U.S. patent application Ser. No. 13/022,290 , filed Feb. 7, 2011, which is incorporated herein by reference in its entirety.

Figure 4:
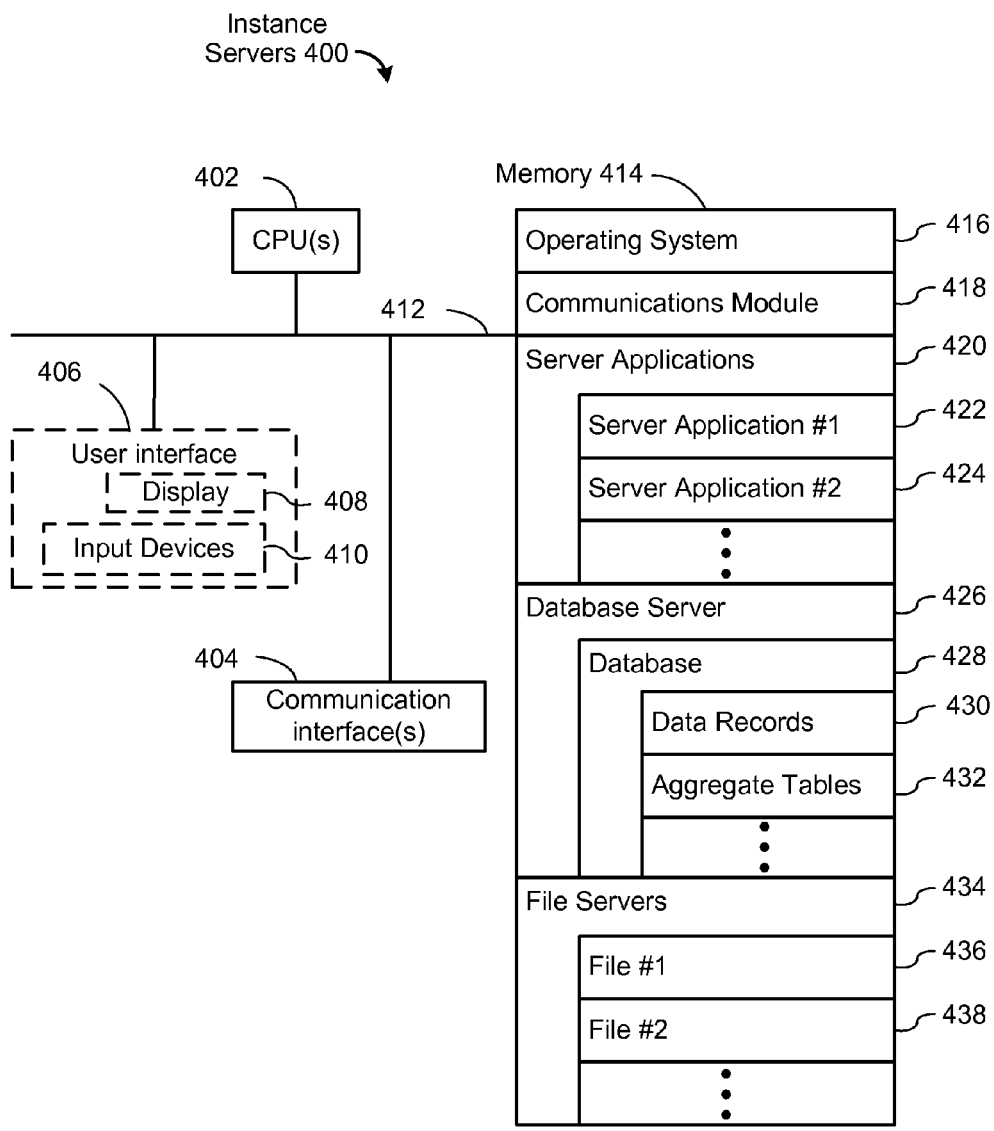
FIG. 4 is a block diagram of an instance server that may be used for the various programs and processes illustrated in FIGS. 1B, 2, and 3, according to some embodiments.

FIG. 4 is a block diagram illustrating an Instance Server 400 used for operations identified in FIGS. 2 and 3 in accordance with some embodiments of the present invention. An Instance Server 400 typically includes one or more processing units (CPU's) 402 for executing modules, programs and/ or instructions stored in memory 414 and thereby performing processing operations; one or more network or other communications interfaces 404; memory 414; and one or more communication buses 412 for interconnecting these components. In some embodiments, an Instance Server 400 includes a user interface 406 comprising a display device 408 and one or more input devices 410. In some embodiments, memory 414 includes high-speed random access memory, such as DRAM, SRAM, DDR RAM or other random access solid state memory devices. In some embodiments, memory 414 includes non-volatile memory, such as one or more magnetic disk storage devices, optical disk storage devices, flash memory devices, or other non-volatile solid state storage devices. In some embodiments, memory 414 includes one or more storage devices remotely located from the CPU(s) 402. Memory 414, or alternately the non-volatile memory device (s) within memory 414, comprises a computer readable storage medium. In some embodiments, memory 414 or the computer readable storage medium of memory 414 stores the following programs, modules and data structures, or a subset thereof:

an operating system 416 that includes procedures for handling various basic system services and for performing hardware dependent tasks;

a communications module 418 that is used for connecting an Instance Server 400 to other Instance Servers or computers via the one or more communication network interfaces 404 (wired or wireless) and one or more communication networks 328, such as the Internet, other wide area networks, local area networks, metropolitan area networks, and so on;

one or more server applications 420, such as a blobmaster 204 that provides an external interface to the blob metadata; a bitpusher 210 that provides access to read and write data from data stores; a replication module 224 that copies data from one instance to another; a quorum clock server 228 that provides a stable clock; a location assignment daemon 322 that determines where copies of a blob should be located; and other server functionality as illustrated in FIGS. 2 and 3. As illustrated, two or more server applications 422 and 424 may execute on the same physical computer;

one or more database servers 426 that provides storage and access to one or more databases 428. The databases 428 may provide storage for metadata 206, replication queues 226, blob policies 326, global configuration 312, the statistics used by statistics server 324, as well as ancillary databases used by any of the other functionality. Each database 428 has one or more tables with data records 430. In some embodiments, some databases include aggregate tables 432, such as the statistics used by statistics server 324; and one or more file servers 434 that provide access to read and write files, such as file #1 (436) and file #2 (438). File server functionality may be provided directly by an operating system (e.g., UNIX or Linux), or by a software application, such as the Google File System (GFS).

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 414 may store a subset of the modules and data structures identified above. Furthermore, memory 414 may store additional modules or data structures not described above.

Although FIG. 4 shows an instance server used for performing various operations or storing data as illustrated in FIGS. 2 and 3, FIG. 4 is intended more as functional description of the various features which may be present in a set of one or more computers rather than as a structural schematic of the embodiments described herein. In practice, and as recognized by those of ordinary skill in the art, items shown separately could be combined and some items could be separated. For example, some items shown separately in FIG. 4 could be implemented on individual computer systems and single items could be implemented by one or more computer systems. The actual number of computers used to implement each of the operations, databases, or file storage systems, and how features are allocated among them will vary from one implementation to another, and may depend in part on the amount of data at each instance, the amount of data traffic that an instance must handle during peak usage periods, as well as the amount of data traffic that an instance must handle during average usage periods.

Figures 5, 6:
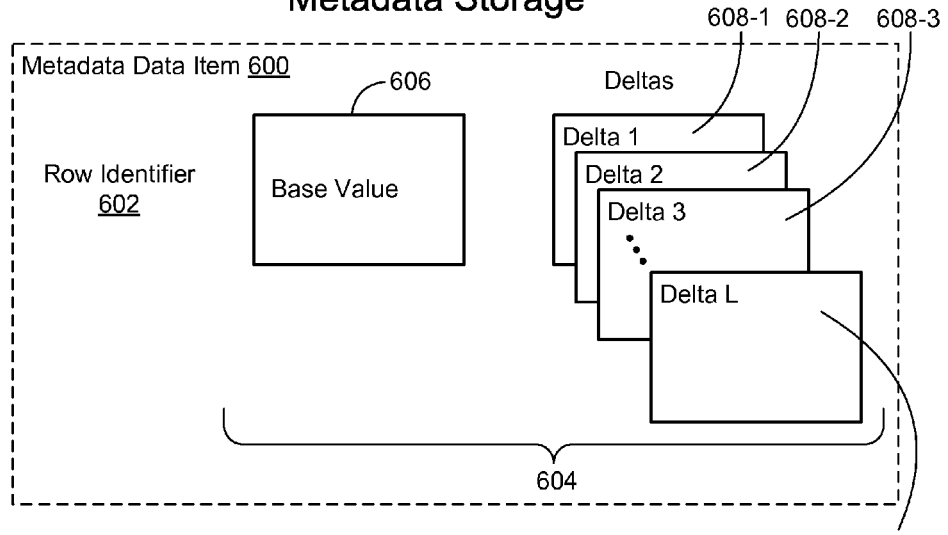
FIG. 5 illustrates a typical allocation of instance servers to various programs or processes illustrated in FIGS. 1B, 2, and 3, according to some embodiments.
FIG. 6 illustrates how metadata is stored according to some embodiments.

To provide faster responses to clients and to provide fault tolerance, each program or process that runs at an instance is generally distributed among multiple computers. The number of instance servers 400 assigned to each of the programs or processes can vary, and depends on the workload. FIG. 5 provides exemplary information about a typical number of instance servers 400 that are assigned to each of the functions. In some embodiments, each instance has about 10 instance servers performing (502) as blobmasters. In some embodiments, each instance has about 100 instance servers performing (504) as bitpushers. In some embodiments, each instance has about 50 instance servers performing (506) as BigTable servers. In some embodiments, each instance has about 1000 instance servers performing (508) as file system servers. File system servers store data for file system stores 216 as well as the underlying storage medium for BigTable stores 214. In some embodiments, each instance has about 10 instance servers performing (510) as tape servers. In some embodiments, each instance has about 5 instance servers performing (512) as tape masters. In some embodiments, each instance has about 10 instance servers performing (514) replication management, which includes both dynamic and background replication. In some embodiments, each instance has about 5 instance servers performing (516) as quorum clock servers.

FIG. 6 illustrates the storage of metadata data items 600 according to some embodiments. Each data item 600 has a unique row identifier 602. Each data item 600 is a row 604 that has a base value 606 and zero or more deltas 608-1, 608-2, . . . , 608-L. When there are no deltas, then the value of the data item 600 is the base value 606. When there are deltas, the "value" of the data item 600 is computed by starting with the base value 606 and applying the deltas 608-1, etc. in order to the base value. A row thus has a single value, representing a single data item or entry. Although in some embodiments the deltas store the entire new value, in preferred embodiments the deltas store as little data as possible to identify the change. For example, metadata for a blob includes specifying what instances have the blob as well as who has access to the blob. If the blob is copied to an additional instance, the metadata delta only needs to specify that the blob is available at the additional instance. The delta need not specify where the blob is already located. The reading of metadata data items 600 is described in more detail with respect to FIG. 13. As the number of deltas increases, the time to read data increases, so there is also a compaction process 1200 described below in FIGS. 8 and 12A-12B. The compaction process merges the deltas 608-1, etc. into the base value 606 to create a new base value that incorporates the changes in the deltas.

Although the storage shown in FIG. 6 relates to metadata for blobs, the same process is applicable to other non-relational databases, such as columnar databases, in which the data changes in specific ways. For example, an access control list may be implemented as a multi-byte integer in which each bit position represents an item, location, or person. Changing one piece of access information does not modify the other bits, so a delta to encode the change requires little space. In alternative embodiments where the data is less structured, deltas may be encoded as instructions for how to make changes to a stream of binary data. Some embodiments are described in publication RFC 3284, "The VCDIFF Generic Differencing and Compression Data Format," The Internet Society, 2002. One of ordinary skill in the art would thus recognize that the same technique applied here for metadata is equally applicable to certain other types of structured data.

Figure 7:
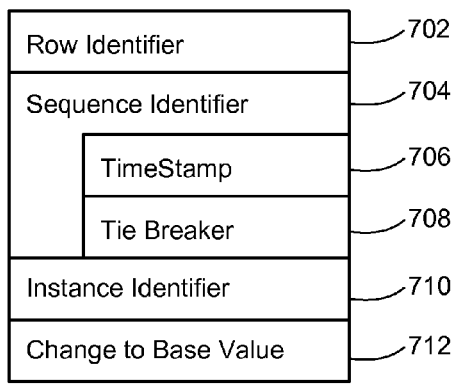
FIG. 7 illustrates an data structure that is used to store deltas according to some embodiments.

FIG. 7 illustrates an exemplary data structure to hold a delta. Each delta applies to a unique row, so the delta includes the row identifier 702 of the row to which it applies. In order to guarantee data consistency at multiple instances, the deltas must be applied in a well-defined order to the base value. The sequence identifier 704 is globally unique, and specifies the order in which the deltas are applied. In some embodiments, the sequence identifier comprises a timestamp 706 and a tie breaker value 708 that is uniquely assigned to each instance where deltas are created. In some embodiments, the timestamp is the number of microseconds past a well-defined point in time. In some embodiments, the tie breaker is computed as a function of the physical machine running the blobmaster as well as a process id. In some embodiments, the tie breaker includes an instance identifier, either alone, or in conjunction with other characteristics at the instance. In some embodiments, the tie breaker 708 is stored as a tie breaker value 132. By combining the timestamp 706 and a tie breaker 708, the sequence identifier is both globally unique and at least approximately the order in which the deltas were created. In certain circumstances, clocks at different instances may be slightly different, so the order defined by the sequence identifiers may not correspond to the "actual" order of events. However, in preferred embodiments, the "order," by definition, is the order created by the sequence identifiers. This is the order the changes will be applied at all instances.

A change to metadata at one instance is replicated to other instances. The actual change to the base value 712 may be stored in various formats. In some embodiments, data structures similar to those in FIGS. 18A-18E are used to store the changes, but the structures are modified so that most of the fields are optional. Only the actual changes are filled in, so the space required to store or transmit the delta is small. In other embodiments, the changes are stored as key/value pairs, where the key uniquely identifies the data element changed, and the value is the new value for the data element.

In some embodiments where the data items are metadata for blobs, deltas may include information about forwarding. Because blobs may be dynamically replicated between instances at any time, and the metadata may be modified at any time as well, there are times that a new copy of a blob does not initially have all of the associated metadata. In these cases, the source of the new copy maintains a "forwarding address," and transmits deltas to the instance that has the new copy of the blob for a certain period of time (e.g., for a certain range of sequence identifiers).

Figure 8:
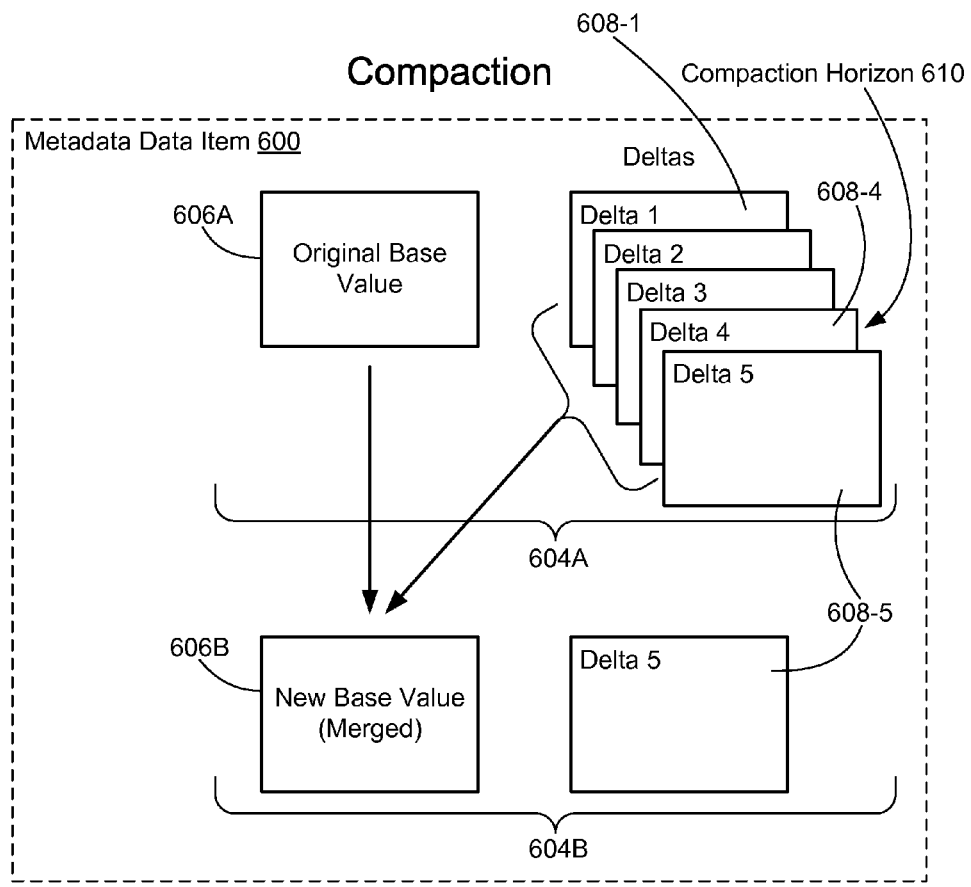
FIG. 8 illustrates an exemplary compaction process according to some embodiments.

FIG. 8 illustrates a compaction process that reduces the number of deltas. If compaction were not performed, the number of deltas would grow without limit, taking up storage space and slowing down performance for reading data. The idea is to apply the deltas to the base value, effectively merging the base values and the deltas into a single new base value. However, because of the existence of multiple copies of the same data at distinct instances, there are some constraints imposed on which deltas may be merged with the base value. In some embodiments, a compaction horizon is selected that specifies the upper limit on which deltas will be merged. In some embodiments, the compaction horizon is selected for a group of data items 600, although a compaction horizon could be selected for an individual data item 600.

Before the compaction process begins, each data item 600 is a row 604A with an original base value 606A, and a set of zero or more deltas 608-1, etc. For a data item 600 with zero deltas, there is nothing to compact. The data item 600 illustrated in FIG. 8 initially has five deltas 608-1 to 608-5. In the embodiment shown, the compaction horizon 610 is somewhere between the sequence identifier of delta 4 (608-4) and the sequence identifier of delta 5 (608-5). More specifically, FIG. 8 depicts an example in which the sequence identifier of delta 4 is less than or equal to the compaction horizon 610, and the compaction horizon is strictly less than the sequence identifier of delta 5. Delta 1 (608-1) through delta 4 (608-4) are applied to the base value 606A in sequence, to produce a new base value 606B that has been merged with the deltas. Delta 1 to delta 4 are then deleted from original row 604A, leaving the new row 604B with the merged base value 606B and a set with the single delta 608-5. If the compaction horizon had included delta 608-5, the new row 604B would not have included any deltas.

The compaction process is also described below in FIGS. 12A-12B, and 17. In particular, the discussion of FIGS. 12A and 12B includes examples of why the compaction horizon may not include all of the deltas at an instance (as illustrated in FIG. 8). Although shown here in the context of a single data item 600, compaction is generally a batch process because of the very large quantities of data and the fact that deltas are generally transmitted between instances in batches.

Figure 9:
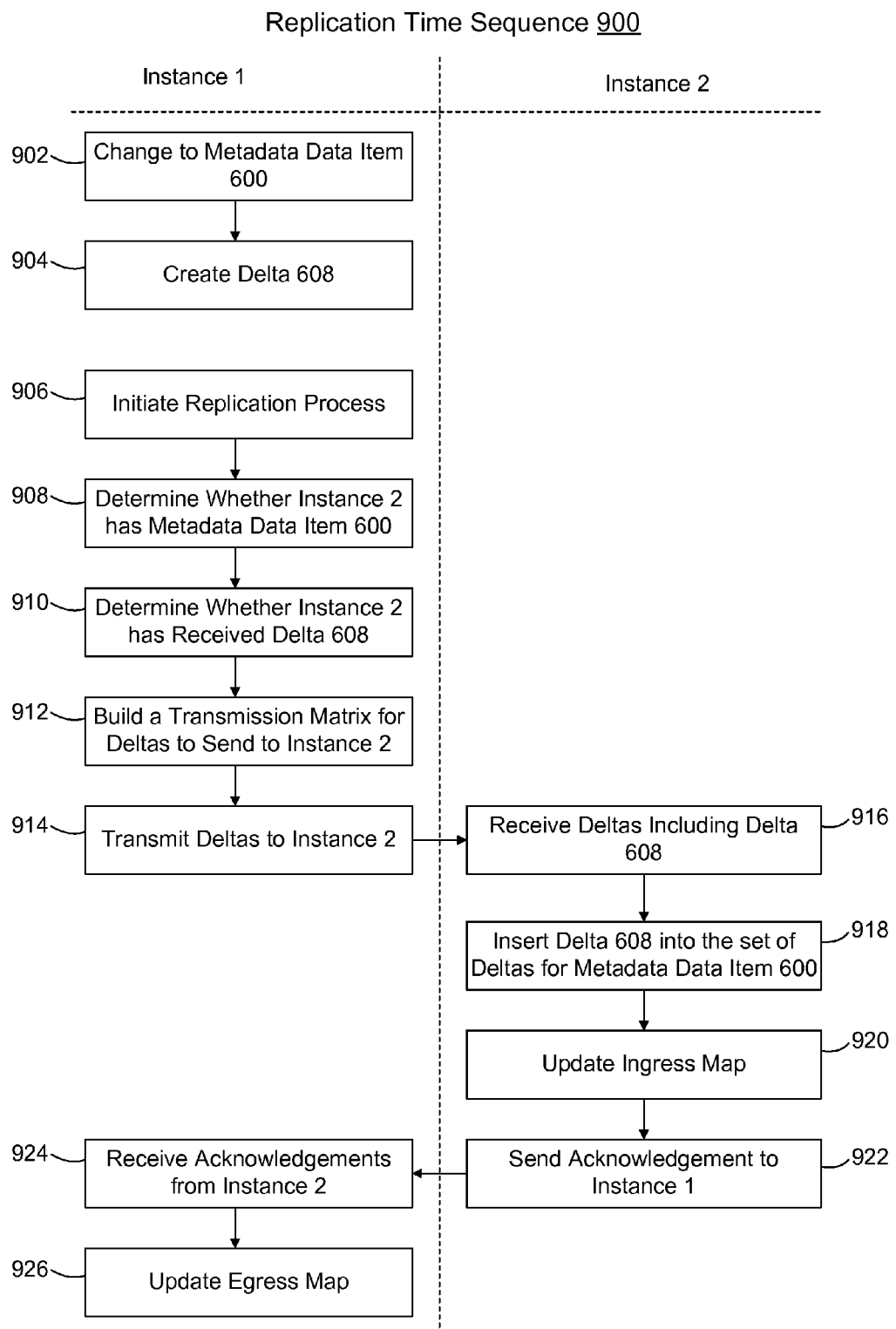
FIG. 9 illustrates a sequence of events in the replication process according to some embodiments.

FIG. 9 illustrates an exemplary process for replicating metadata from one instance to another instance. Although the simple illustration in FIG. 9 shows only a single metadata data item 600 and a single delta 608, the method is generally applied to much larger batches as illustrated below with respect to FIGS. 15A-15B.

The replication process described here applies to existing copies of data at multiple instances. When metadata at one instance changes, the changes must be replicated to all other instances that have metadata for the same underlying data. Co-pending U.S. Provisional Patent Application Ser. No. 61/302,936, filed Feb. 9, 2010, subsequently filed as U.S. patent application Ser. No. 13/022,290, filed Feb. 7, 2011, describes a different replication process, where a new copy of data is replicated to a new instance. In this latter instance, a complete copy of the metadata must be sent to the new instance, and any recent changes to the metadata must get to the new instance as well.

The replication process effectively begins when a change to metadata occurs (902) at one instance that will require replication to other instances. When the change (also known as a mutation) occurs, a delta is created (904) to specify the change. An exemplary format is illustrated in FIG. 7 and described above. In principle, the delta could be replicated immediately, but deltas are generally transmitted in batches as more fully illustrated in the exemplary processes shown in FIGS. 15A-15B.

At some point, the replication process is initiated (906). In some embodiments, replication can be initiated manually. In other embodiments, replication is a scheduled background process (e.g., triggered at certain time intervals, certain times of the day, or when the workload is low). In preferred embodiments, replication runs continuously in the background. In some embodiments, every instance has metadata for each of the blobs, regardless of whether the blobs are physically stored at the instance. In other embodiments, there are a limited number of global instances that maintain metadata for all of the blobs, and a greater number of local instances that maintain metadata only for the blobs stored at the instance. For replication targets that are local instances, the replication process determines (908) whether the metadata item 600 resides at the replication target. In some embodiments, the replication process determines all instances that require the changed metadata.

Figure 15A:
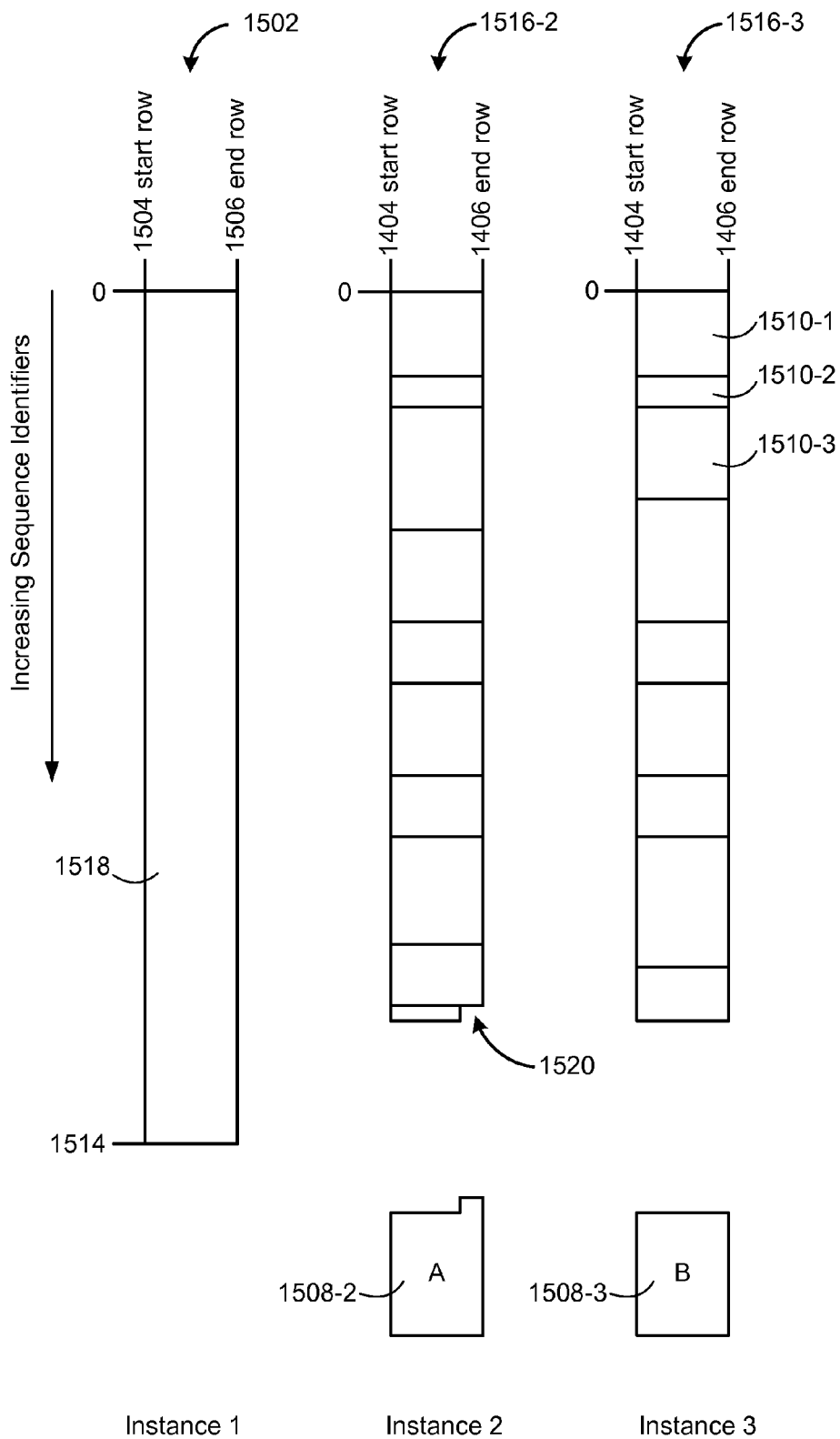
FIGS. 15A-15B illustrate a process of developing a transmission plan for sending database changes to other instances according to some embodiments.
Figure 15B:
Figure 15B:
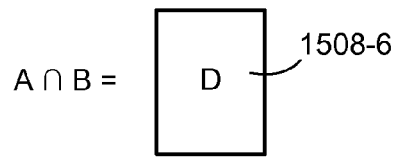
Figure 15B:
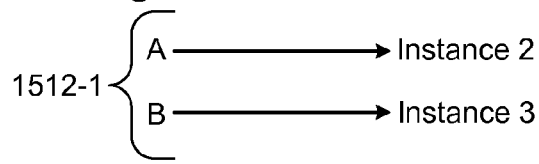
Figure 15B:
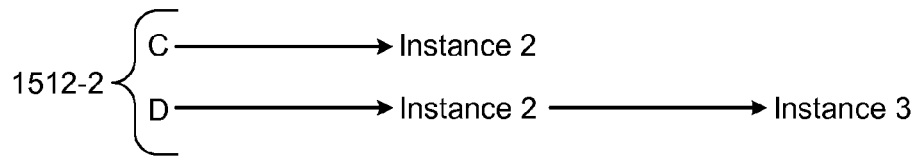
Figure 15B:
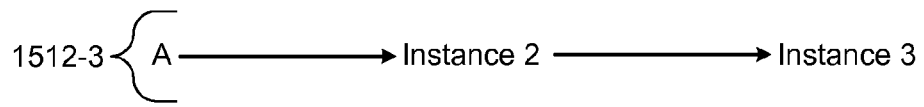
Figure 15B:
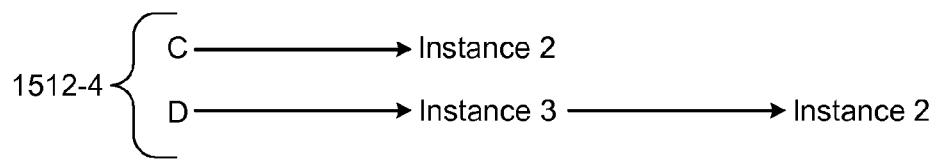

For the target instances that have the metadata data item 600, the replication process determines (910) whether the target instance has received delta 608. In some embodiments, this determination uses an egress map 134, as shown in FIGS. 14A and 14B and described in more detail in FIGS. 15A-15B. Based on the deltas to send, and which deltas have already been received at each target instance, the replication process builds (912) a transmission matrix that specifies a group of deltas to transmit to each target instance. In some embodiments, the transmission matrix is a two-dimensional shape (e.g., a rectangle) as illustrated in FIGS. 15A-15B. In other embodiments, the transmission matrix is a list or one-dimensional array. The replication process then transmits (914) the selected deltas to each target instance.

At a target instance, the deltas are received (916) and each delta is inserted (918) into the set of deltas for the corresponding metadata data item 600. In some embodiments, the replication process updates (920) an ingress map 136 to indicate that the delta (or batch of deltas) has been incorporated into the metadata at the target instance. The replication process at the target instance also sends an acknowledgement back to the sender to indicate that the deltas have been received and incorporated.

The original sender of the deltas receives (924) the acknowledgement from the target instance, and updates (926) an egress map 134. By updating the egress map, the same deltas will not be transmitted to the same target again in the future. The updated egress map also enables compaction of deltas, as explained in more detail with respect to FIGS. 12A and 12B.

Figure 10:
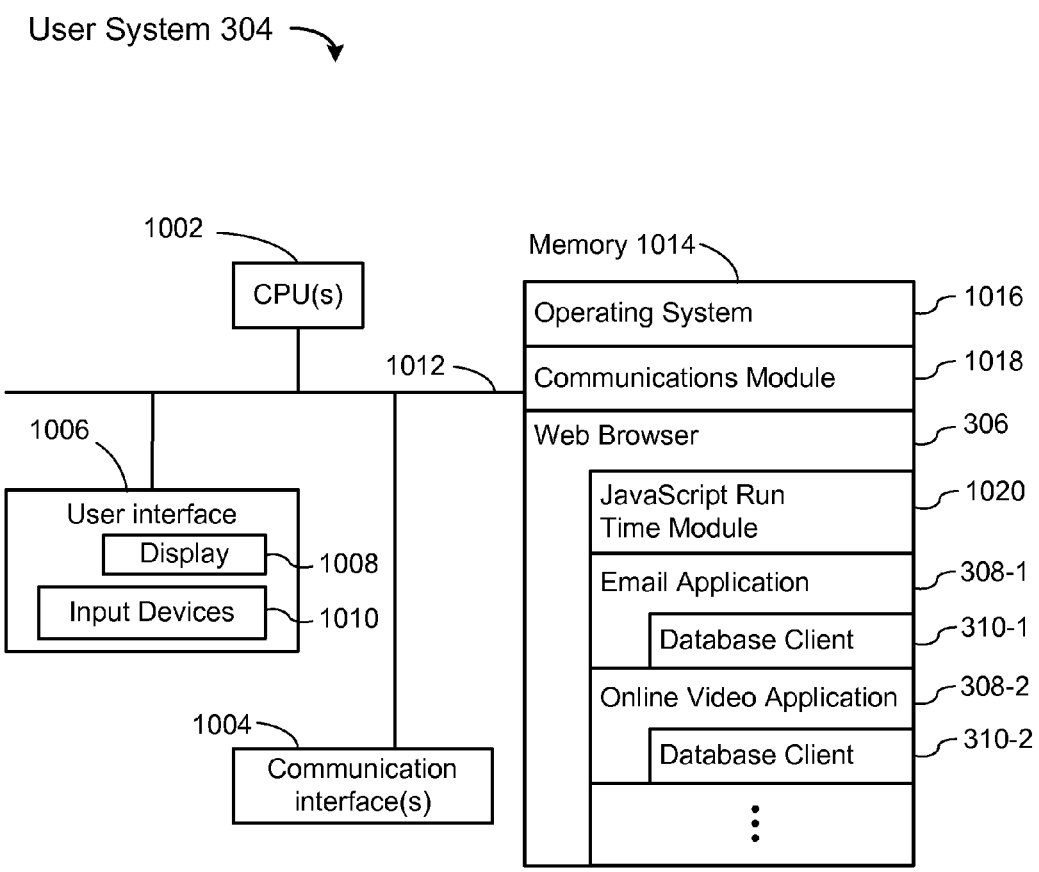
FIG. 10 is a block diagram that illustrates a client computer according to some embodiments.

FIG. 10 is a block diagram illustrating a client computer system 304 that is used by a user 302 to access data stored at an instance 102 in accordance with some embodiments of the present invention. A client computer system 304 typically includes one or more processing units (CPU's) 1002 for executing modules, programs and/or instructions stored in memory 1014 and thereby performing processing operations; one or more network or other communications interfaces 1004; memory 1014; and one or more communication buses 1012 for interconnecting these components. The communication buses 1012 may include circuitry (sometimes called a chipset) that interconnects and controls communications between system components. A client computer system 304 includes a user interface 1006 comprising a display device 1008 and one or more input devices 1010 (e.g., a keyboard and a mouse or other pointing device). In some embodiments, memory 1014 includes high-speed random access memory, such as DRAM, SRAM, DDR RAM or other random access solid state memory devices. In some embodiments, memory 1014 includes non-volatile memory, such as one or more magnetic disk storage devices, optical disk storage devices, flash memory devices, or other non-volatile solid state storage devices. Optionally, memory 1014 includes one or more storage devices remotely located from the CPU(s) 1002. Memory 1014, or alternately the non-volatile memory device(s) within memory 1014, comprises a computer readable storage medium. In some embodiments, memory 1014 or the computer readable storage medium of memory 1014 stores the following programs, modules and data structures, or a subset thereof:
- an operating system 1016 that includes procedures for handling various basic system services and for performing hardware dependent tasks;
- a communications module 1018 that is used for connecting the client computer system 304 to other computers via the one or more communication network interfaces 1004 (wired or wireless) and one or more communication networks 328, such as the Internet, other wide area networks, local area networks, metropolitan area networks, and so on; and
- a web browser 306 (or other client application) that enables a user to communicate over a network 328 (such as the Internet) with remote computers. In some embodiments, the web browser 306 uses a JavaScript run-time module 1020 to perform some functions.
- one or more user applications 308 that provide specific functionality. For example, user applications 308 may include an email application 308-1 and/or an online video application 308-2.
- one or more database clients, such as email database client 310-1 or video database client 310-2, that provide an API for the data stored at instances 102 to user applications 308.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 1014 may store a subset of the modules and data structures identified above. Furthermore, memory 1014 may store additional modules or data structures not described above.

Although FIG. 10 shows a client computer system 304 that may access data stored at an instance 102, FIG. 10 is intended more as functional description of the various features which may be present in a set of one or more computers rather than as a structural schematic of the embodiments described herein. In practice, and as recognized by those of ordinary skill in the art, items shown separately could be combined and some items could be separated.

Figure 11A:
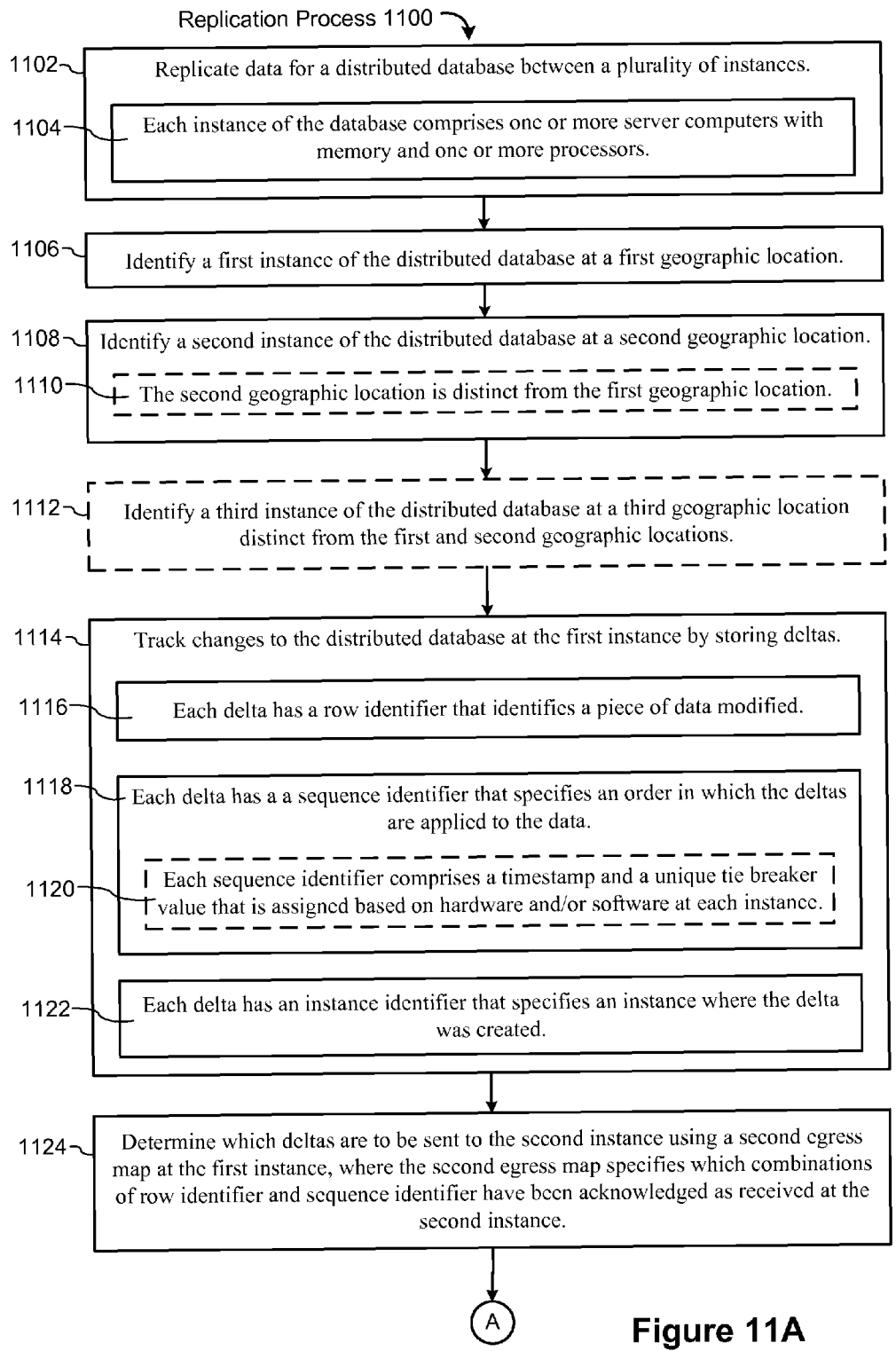
FIGS. 11A-11C illustrate a method of replicating distributed data according to some embodiments.
Figure 11B:
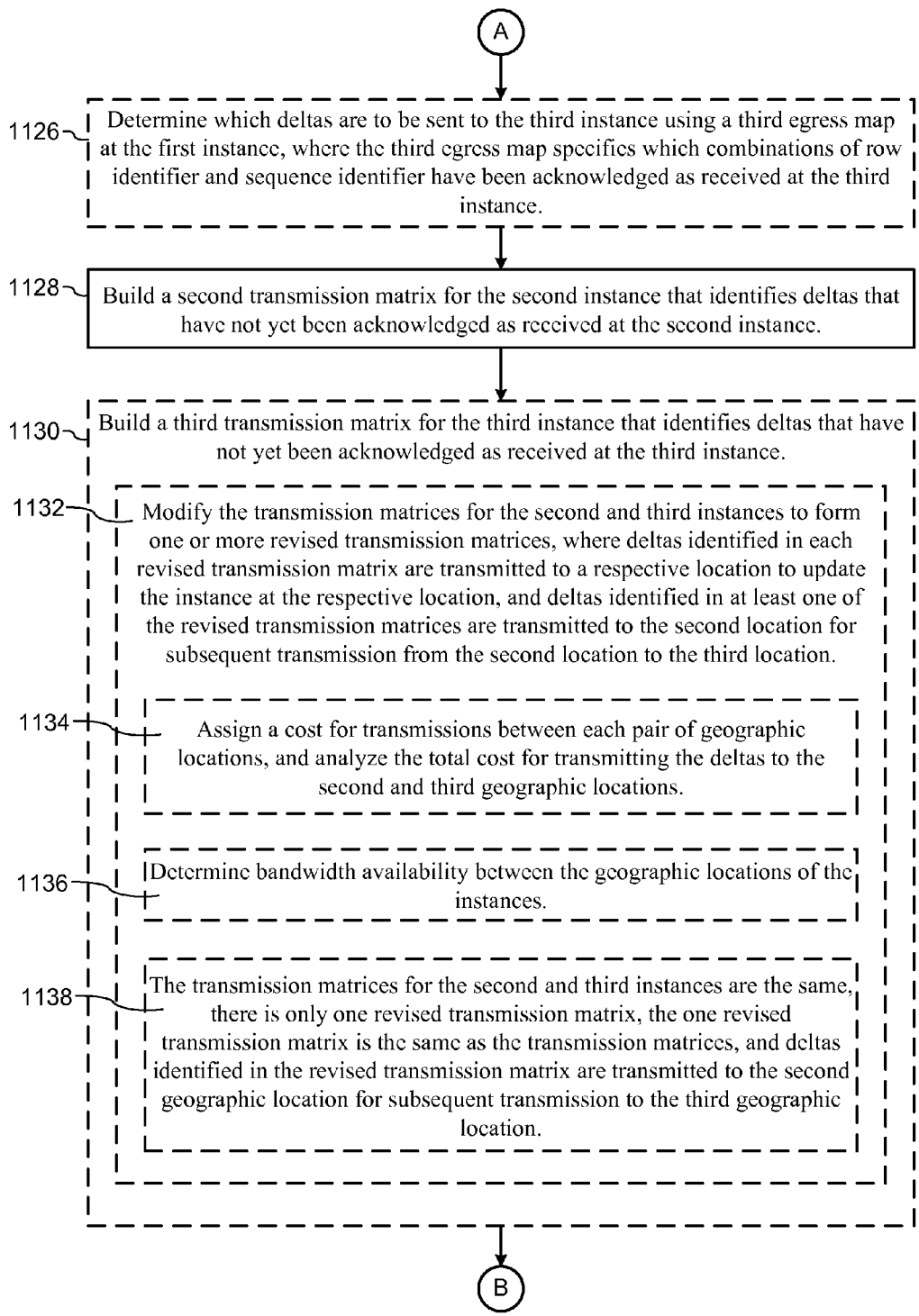
Figure 11C:
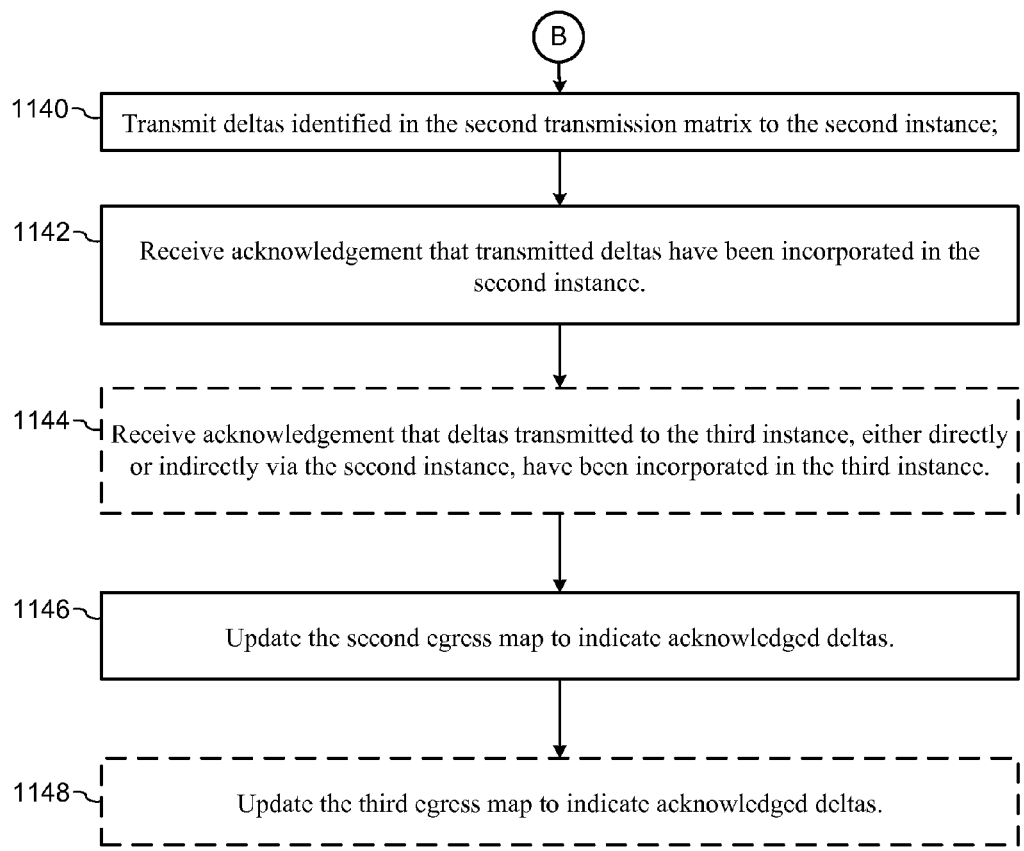

FIGS. 11A-11C provide a flowchart of an exemplary process 1100 for replicating (1102) data between a plurality instances of a distributed database. In one embodiment, the distributed database holds metadata for a distributed storage system. In some embodiments, each instance of the distributed database is stored on one or more server computers, each having memory and one or more processors (1104).

The replication process 1100 identifies (1106) a first instance of the database at a first geographic location and identifies (1108) a second instance of the database at a second geographic location. In some embodiments, the second geographic location is distinct from the first location (1110). In some embodiments, a third instance of the database is identified (1112) at a third geographic location, which is distinct from the first and second geographic locations. In some embodiments, there are four or more instances of the database. In some embodiments, two or more instances of the database reside at the same geographic location. One reason for having multiple instances at the same geographic site is to provide for maintenance zones. In some embodiments, a single data center has multiple maintenance zones, and each such zone comprises an instance in the distributed database system. In some embodiments, when an instance is going to be taken down for maintenance, the data is replicated to one or more other instances beforehand, which may be other instances at the same data center.

For example, there may be single instances of the database in Atlanta, Seattle, and Los Angeles, and two instances of the database in Boston. In some embodiments, there are instances of the database on every continent except Antarctica, and even some instances on islands. The disclosed distributed storage system imposes no limit on the number or location of instances.

To facilitate efficient replication, changes to the distributed database are tracked as deltas (1114). Each delta has a row identifier that identifies the piece of data modified (1116). Each delta also has a sequence identifier that specifies the order in which the deltas are applied to the data (1118). The sequence identifiers are globally unique throughout the distributed storage system, so there is no ambiguity about the order in which the deltas are applied to the data. In some embodiments, the sequence identifier comprises (1120) a timestamp and a unique tie breaker value that is assigned based on hardware and/or software at each instance. In some embodiments, the timestamp specifies the number of microseconds after a designated point of time in the past. In some embodiments, the tie breaker value is computed based on one or more of the following values: an identifier of a physical machine at the instance, such as a unique serial number or a network interface card (NIC) address; an instance identifier; a process id of a specific process running at the instance (e.g., a UNIX process ID assigned to the database process). Because the tie-breaker is a unique value assigned to each instance, the combination of a timestamp and the tie breaker provides a sequence identifier based on time, but guaranteed to be unique.

The time clocks at each instance are not guaranteed to be synchronized to the microsecond and thus the ordering defined by the sequence identifiers is not guaranteed to match exactly what happened. However, if two changes to the same metadata item 600 occur about the same time at two distant locations on the globe (e.g., Los Angeles and Paris), the exact order is unimportant. Having a well-defined unique order that will be applied to every instance of the database is the more relevant issue, and this is provided by sequence identifiers. Moreover, in embodiments that use a timestamp or something similar to create the sequence identifiers, the sequence identifiers are in the right time sequence order virtually all of the time because multiple changes to the same metadata rarely occur at the same time at two distinct instances.

Each delta includes an instance identifier (1122) as well. Each instance is responsible for pushing out its changes (i.e., deltas) to all of the other instances, so each instance must be able to recognize the deltas that it created. In some embodiments, the instance identifier is saved as part of the data structure for each individual delta. In other embodiments, the association between deltas and instances is stored differently. For example, deltas may include a bit flag that indicates which deltas were created at the current instance. In other embodiments, the instance identifier is not stored as a separate data element because it is stored as part of the sequence identifier, or can be readily derived from the sequence identifier.

The replication process 1100 determines (1124) which deltas are to be sent to the second instance using a second egress map 134 at the first instance, where the second egress map specifies which combinations of row identifier and sequence identifier have been acknowledged as received at the second instance. An egress map 134 can be stored in a variety of ways, as illustrated in FIGS. 14A and 14B. FIG. 14B illustrates a map that might be used if the egress map were stored in a typical database. In this example, each row represents a single delta that is to be transmitted to a single destination. The destination instance 1412 specifies to what instance the delta has been (or will be) sent. The row identifier 1414 and sequence identifier 1416 specify the row identifier and sequence identifier of a delta. In some embodiments, presence of a row in this egress table indicates that the delta has been acknowledged as received at the destination instance. In other embodiments, there is an additional field, such as "acknowledged," which is updated when the deltas are acknowledged. In these embodiments, rows may be inserted into the egress table as soon as deltas are created, or prior to transmission of the deltas to destination instances. In some embodiments, there is a separate egress table for each destination instance, so the rows in each egress table do not need to specify a destination instance.

Although the egress table in FIG. 14B is conceptually simple, it consumes considerable resources, both in time and disk space. In preferred embodiments, a structure similar to the one shown in FIG. 14A may be used. In the egress table 134 shown in FIG. 14A, each record specifies a two dimensional rectangle of deltas. In one dimension, the start row 1404 and end row 1406 specify the beginning and ending of a range of row identifiers. In a second dimension, the start sequence 1408 and end sequence 1410 specify the beginning and ending of a range of sequence identifiers. Although this two dimensional region could theoretically contain a very large number of deltas, this two dimensional region is actually sparse for three reasons. First, within the continuous range of row identifiers, few of the rows will actually have any changes. Second, very few of the potential sequence identifiers within the range are actually used. For example, an exemplary timestamp used to form sequence identifiers uses microseconds, but there are not changes to metadata occurring every microsecond. Third, each sequence identifier that is used applies to a single delta, and that single delta applies to a unique row of data.

In some embodiments that use egress maps similar to the one depicted in FIG. 14A, there is no overlap between distinct rows in the table. In these embodiments, each delta corresponds to a unique record in the egress table for each destination instance. In other embodiments, overlapping rectangles are allowed. Even when the same delta is transmitted to another instance multiple times, it will only be inserted one time, so multiple acknowledgements for the same delta do not indicate an error condition.

In some embodiments, there is a separate egress table for each destination instance, so the rows in each egress table do not need to specify a destination instance. The usage of egress tables is described in more detail below with respect to FIGS. 15A-15B.

Attention is directed back to the replication process 1100, which continues in FIG. 11B. In some embodiments, the replication process 1100 determines (1126) which deltas are to be sent to the third instance using a third egress map at the first instance, where the third egress map specifies which combinations of row identifier and sequence identifier have been acknowledged as received at the third instance. This process is analogous to the process used to determine which deltas to send to the second instance.

The use of "second" in "second egress map" and "third" within "third egress map" are solely to identify a specific egress map, and do not imply or suggest the existence of a first egress map. This same use of "second" and "third" appears below with respect to transmission matrices as well.

The replication process 1100 builds (1128) a second transmission matrix for the second instance that identifies deltas that have not yet been acknowledged as received at the second instance. In some embodiments, the replication process 1100 selects a range of row identifiers, and manages all deltas that correspond to rows with row identifiers within the specified range, regardless of sequence identifier. The selection without regard to sequence identifier is equivalent to selecting a range of sequence identifiers from 0 (or the lowest value) to the highest sequence identifier currently in use. This is a two dimensional rectangle that contains all possible deltas for the rows contained in the rectangle. Because this large rectangle contains all possible deltas of interest, and the egress map 134 indicates which deltas have already been transmitted to the second instance and acknowledged, the difference (i.e., the set-theoretic difference) identifies the set to send to the second instance. This process is described in more detail with respect to FIGS. 15A-15B below.

In preferred embodiments, the transmission matrix is built using information from the egress map about what deltas have been acknowledged as received by the second instance. In this case, it is possible (and sometimes desirable) to re-send deltas that have already been transmitted to the second instance. In some cases resending is useful because there was a failure at some point in the previous attempt (e.g., the transmission did not reach the destination, the destination was down and therefore could not receive the transmission, there was a failure at the destination in the middle of processing the deltas, or an acknowledgement was sent back but never received at the first instance). Even if a previous transmission was fully or partially incorporated into the destination instance, re-sending the deltas does not create a problem because only the missing deltas will be inserted. When the re-sent transmission is complete, an acknowledgement will be sent to the first instance for the entire batch of deltas, potentially including some deltas that were already incorporated into the second instance but not yet acknowledged.

In some embodiments, the replication process builds (1130) a third transmission matrix for the third instance that identifies deltas that have not yet been acknowledged as received at the third instance. This process is analogous to building (1128) the second transmission matrix as described above.

Figure 16:
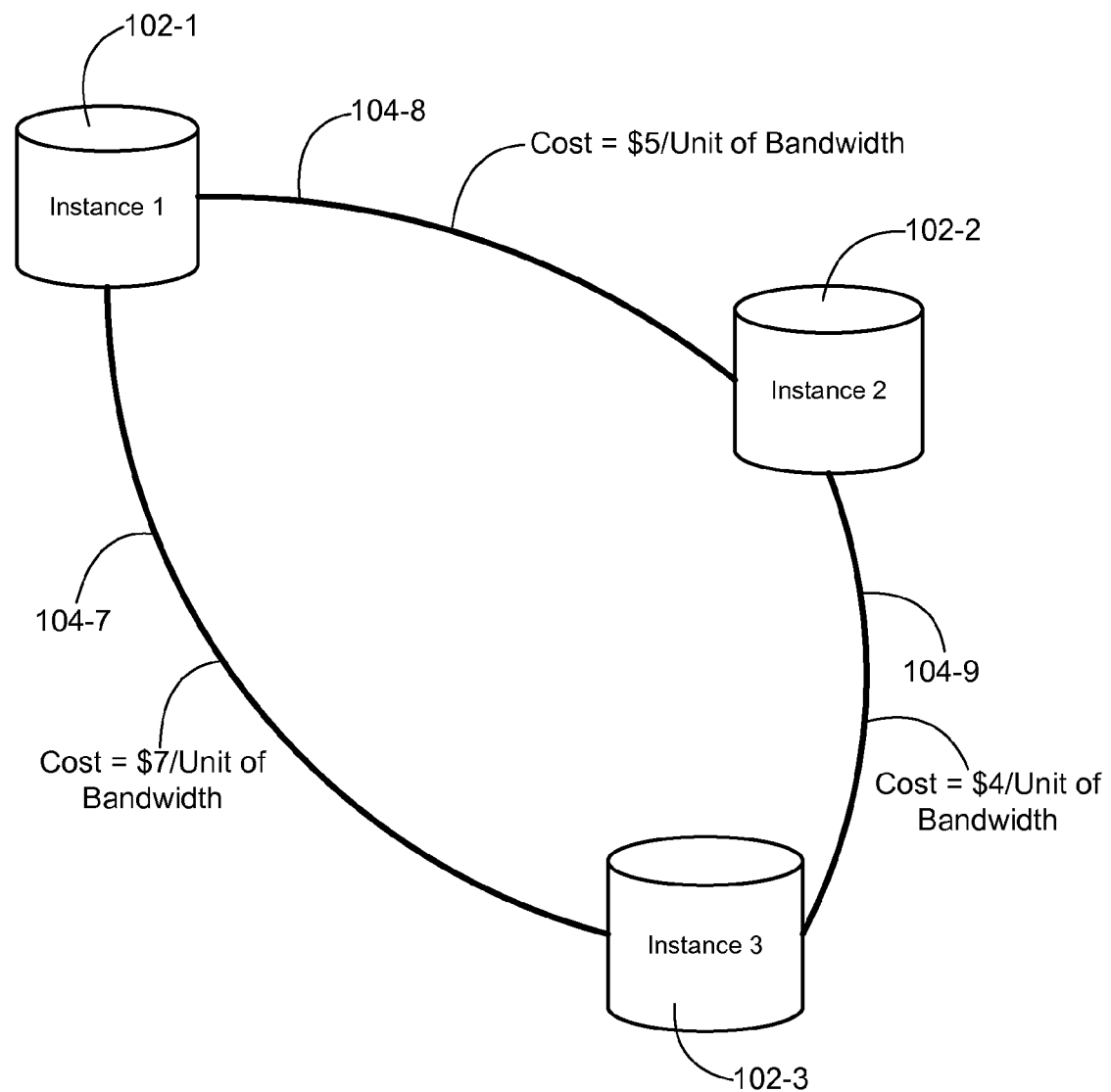
FIG. 16 provides an example of evaluating the cost of various transmission plans according to some embodiments.

Once transmission matrices have been created for multiple instances, the transmission matrices and their destinations can be modified in several ways to better utilize resources. In this context, network bandwidth is one important resource that is both limited and costly. One simple example is illustrated in FIG. 16. In this example, suppose the transmission matrices to the second and third instances are the same, and suppose the deltas corresponding to these transmission matrices use one unit of bandwidth. The total cost would be $5+$7=$12 if the deltas were transmitted directly to the second and third instances using network links 104-8 and 104-7. However, if the deltas were transmitted to Instance 2 using network link 104-8, and then on to Instance 3 using network link 104-9, the total cost would be only $5+$4=$9. In general, other factors would be considered, including the availability of the network bandwidth, the reliability of the network links, processing power at each of the instances, etc.

The previous example was based on the assumption that the same transmission matrices applied to both the second and third instances. Although this is commonly true, they may be different. However, even when they are different, the difference is often small, so modifying the transmission matrices may produce new ones that are more efficient, as explained in more detail with respect to FIGS. 15A-15B below.

In some embodiments, the replication process 1100 modifies (1132) the transmission matrices for the second and third instances to form one or more revised transmission matrices. The deltas identified in each revised transmission matrix are transmitted (1132) to a respective location to update the instance at the respective location, and deltas identified in at least one of the revised transmission matrices are transmitted to the second location for subsequent transmission from the second location to the third location. In some embodiments, the modification of the transmission matrices is based on analysis of the total cost for transmitting the deltas to the second and third geographic locations (1134), and includes assigning (1134) a cost for transmissions between each pair of geographic locations. In some embodiments, the modification to the transmission matrices includes determining (1136) bandwidth availability between the geographic locations of the instances. In some circumstances, the transmission matrices for the second and third instances are the same. Sometimes when this occurs, there is only one revised transmission matrix, which is the same as the transmission matrices, and deltas identified in the revised transmission matrix are transmitted to the second geographic location for subsequent transmission to the third geographic location (1138). However, having two (or more) transmission matrices that are the same does not necessarily lead to revising the transmission matrices, or sending the deltas to one instance for subsequent forwarding to another instance. For example, if the cost of network link 104-9 in FIG. 16 were $10/Unit of Bandwidth instead of $4/Unit as depicted in the figure, then it would be more cost effective to transmit the deltas to instance 2 and instance 3 directly.

The replication process 1100 transmits (1140) deltas identified in the second transmission matrix to the second instance. If the process does not fail, the first instance ultimately receives (1142) acknowledgement that transmitted deltas have been incorporated in the second instance. The replication process updates (1146) the second egress map to indicate the acknowledged deltas. In some embodiments, the first instance receives (1144) acknowledgement that deltas transmitted to the third instance, either directly or indirectly via the second instance, have been incorporated into the third instance. When the first instance receives (1144) acknowledgement regarding deltas transmitted to the third instance, the replication process updates (1148) the third egress map to indicate acknowledged deltas.

Figure 12A:
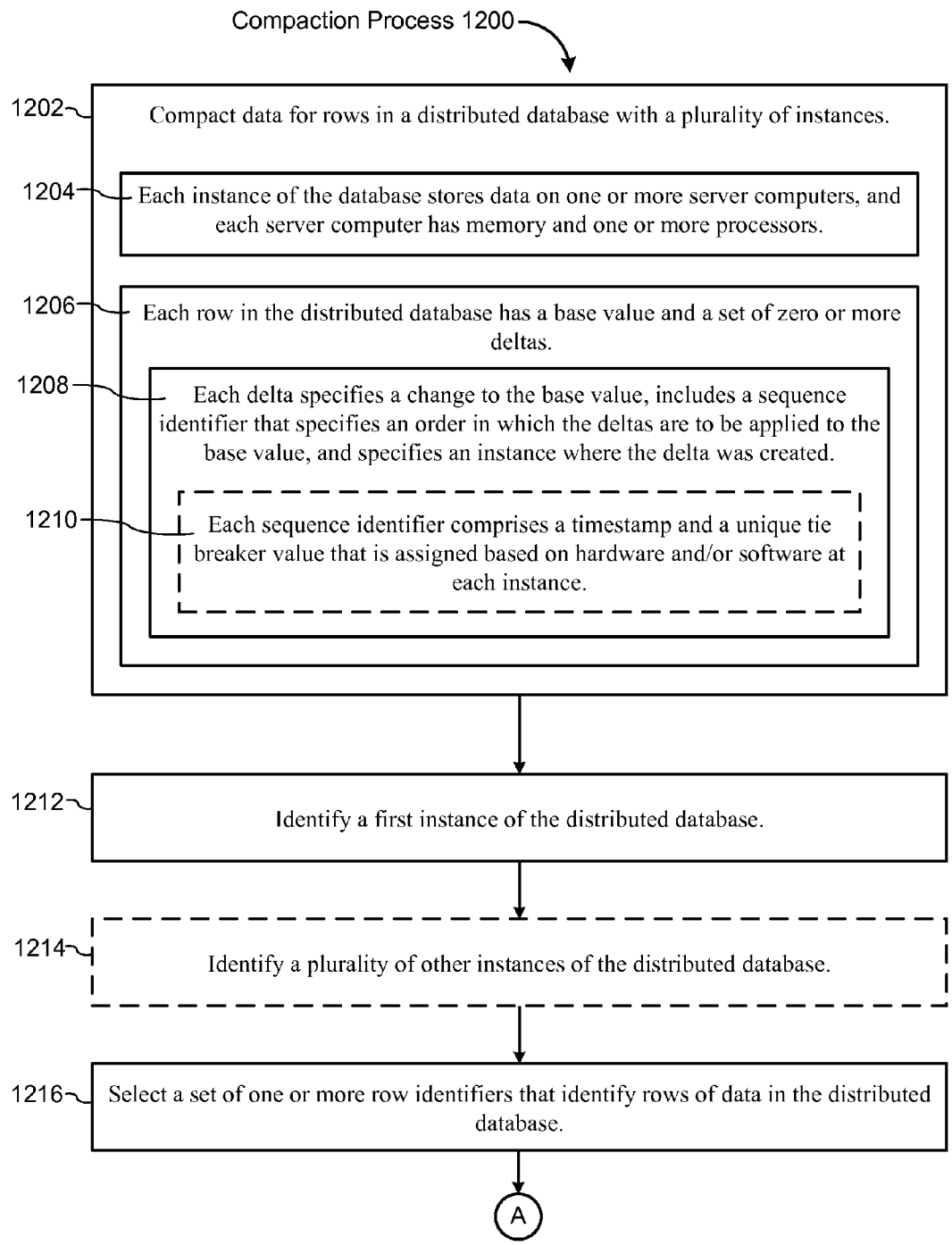
FIGS. 12A-12B illustrate a method of compacting data in a distributed database according to some embodiments.
Figure 12B:
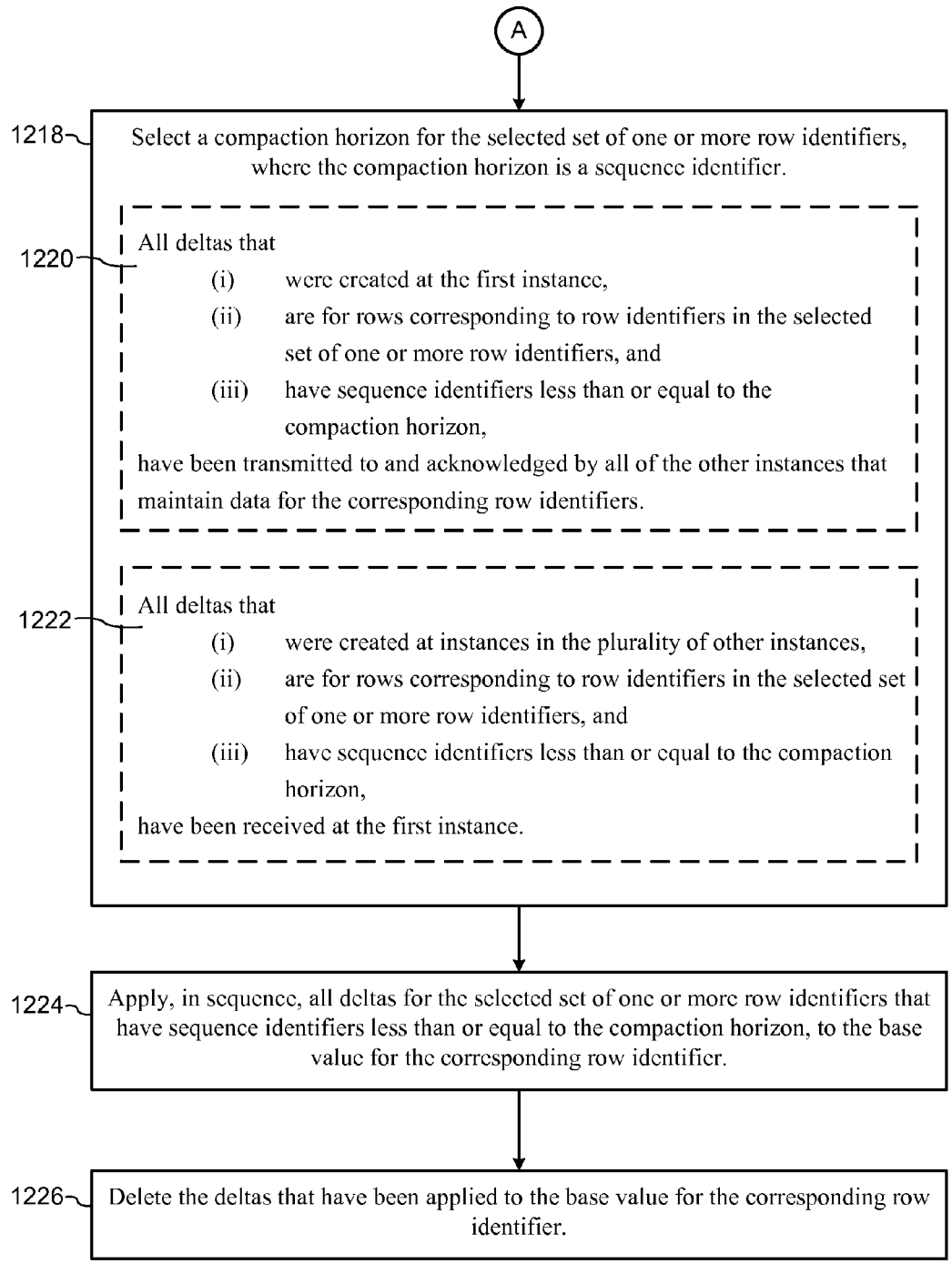

FIGS. 12A and 12B illustrate an exemplary compaction process 1200 that compacts (1202) data for rows in a distributed database with a plurality of instances. Each instance of the database stores (1204) data on one or more server computers, and each server computer has (1204) memory and one or more processors. Each row in the distributed database has (1206) a base value and a set of zero or more deltas as illustrated in FIG. 6. Each delta specifies (1208) a change to the base value, includes a sequence identifier that specifies (1208) the order in which the deltas are to be applied to the base value, and specifies (1208) the instance where the delta was created. In some embodiments, each sequence identifier comprises (1210) a timestamp and a unique tie breaker value that is assigned based on hardware and/or software at each instance.

The compaction process 1200 identifies (1212) a first instance of the distributed database. Compaction will occur at this instance. In some embodiments, the compaction process 1200 identifies (1214) a plurality of other instances of the distributed database. In some embodiments, one or more of the other instances are at other geographic locations distinct from the geographic location of the first instance. The compaction process 1200 selects (1216) a set of one or more row identifiers that identify rows of data in the distributed database. In some preferred embodiments, the set of rows comprises a contiguous range of rows.

The compaction process 1200 selects (1218) a compaction horizon for the selected set of one or more row identifiers. In some embodiments, the compaction horizon is a sequence identifier of a delta for a row corresponding to a row identifier in the selected set. The compaction horizon has the same data format as sequence identifiers so that sequence identifiers can be compared to the compaction horizon. I.e., each sequence identifier is either less than the compaction horizon, equal to the compaction horizon, or greater than the compaction horizon. The compaction horizon need not be equal to any of the sequence identifiers that are assigned to deltas.

In some embodiments, the compaction horizon must satisfy one or more criteria. In some embodiments, deltas at the first instance with corresponding sequence identifiers less than or equal to the compaction horizon must have been transmitted to all other appropriate instances (1220): specifically, all deltas that (i) were created at the first instance, (ii) are for rows corresponding to row identifiers in the selected set of one or more row identifiers, and (iii) have sequence identifiers less than or equal to the compaction horizon, have been transmitted to and acknowledged by all of the other instances that maintain data for the corresponding row identifiers (1220). In some embodiments, the transmission of deltas to other instances is verified using one or more egress maps (which are described above with respect to the replication process 1100). In some embodiments, the first instance must have received all deltas from other instances that are relevant to the selected set of rows and have sequence identifiers less than or equal to the compaction horizon (1222): specifically, all deltas that (i) were created at instances in the plurality of other instances, (ii) are for rows corresponding to row identifiers in the selected set of one or more row identifiers, and (iii) have sequence identifiers less than or equal to the compaction horizon, have been received at the first instance (1222). In some embodiments, receipt of deltas from other instances is verified using one or more ingress maps (which are described in more detail below with respect to FIGS. 14C and 14D). The selection of a compaction horizon is also described in more detail below with respect to FIG. 17.

After the compaction horizon is selected, the compaction process applies (1224), in sequence, all deltas for the selected set of one or more row identifiers that have sequence identifiers less than or equal to the compaction horizon, to the base value for the corresponding row identifier. This is shown graphically in FIG. 8, where data item 600 has original base value 606A and set of deltas 608-1 to 608-5. In the example of FIG. 8, the sequence identifiers for the first four deltas are less than or equal to the compaction horizon, but the fifth delta 608-5 has a sequence identifier greater than the compaction horizon. The compaction process applies (or merges) the deltas with the original base value 606A to create a new base value 606B. The compaction process also deletes (1226) the deltas that have been applied to the base value. In the example in FIG. 8, the first four deltas have been deleted, leaving only the fifth delta 608-5 (which was greater than the compaction horizon).

Figure 13:
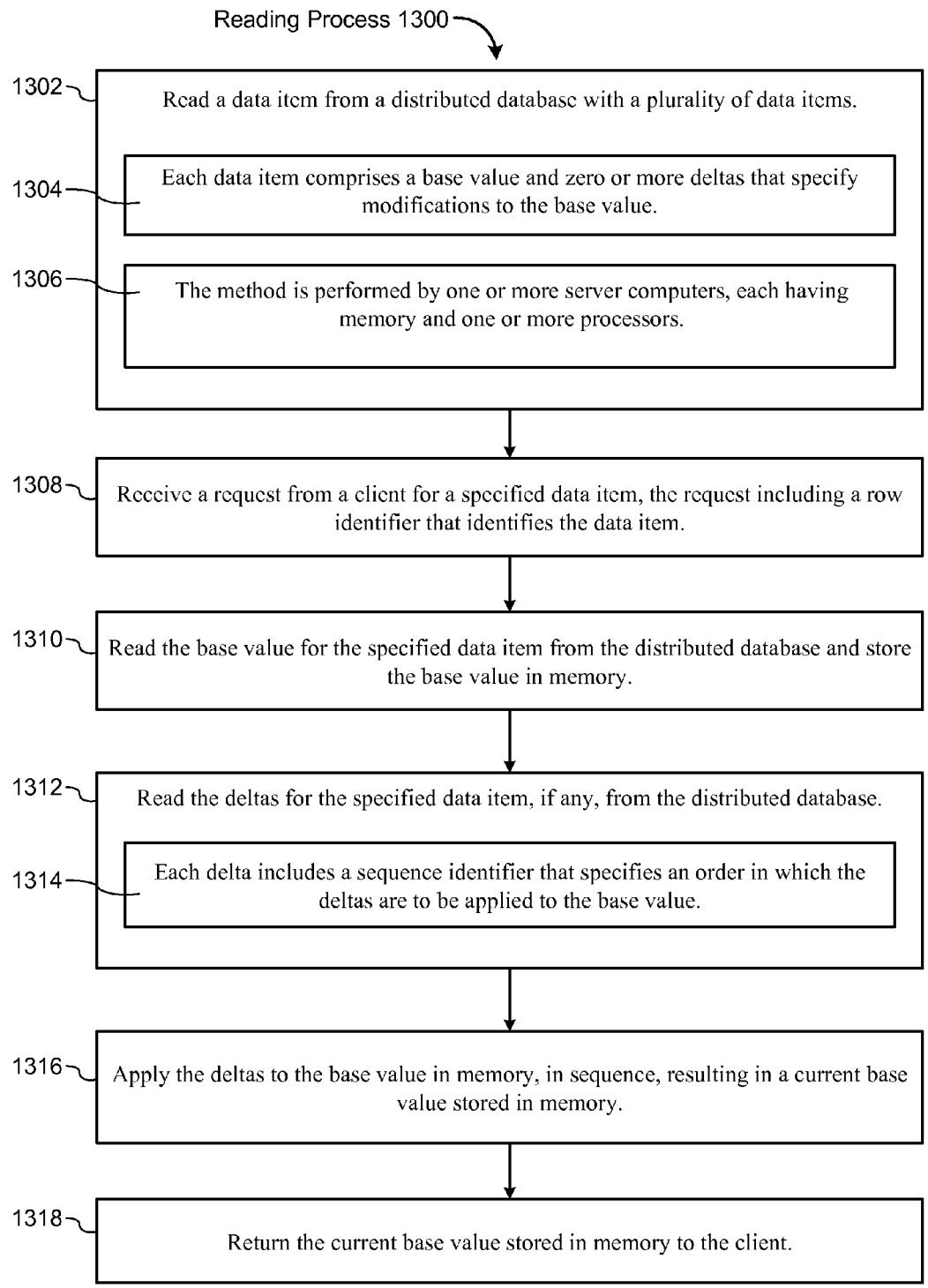
FIG. 13 illustrates a method of reading a piece of data from a distributed database according to some embodiments.

FIG. 13 illustrates an exemplary process 1300 for reading (1302) a data item from a distributed database with a plurality of data rows. Each row comprises (1304) a base value and zero or more deltas that specify modifications to the base value. This is illustrated in FIG. 6. The reading process is performed (1306) by one or more server computers, each having memory and one or more processors.

The reading process 1300 receives (1308) a request from a client for a specified data item 600. The request includes (1308) a row identifier that identifies the data item 600. The process 1300 reads (1310) the base value 606 for the specified data item from the distributed database, and stores (1310) the base value in memory. The process 1300 also reads (1312) the deltas 608-1 to 608-L for the specified data item, if any, from the distributed database. Each delta includes (1314) a sequence identifier 704 that specifies the order in which the deltas are to be applied to the base value. Typically there are no deltas at all for any individual data item 600, so the value for the data item is just the base value 606.

The process 1300 applies (1316) the deltas 608 to the base value stored in memory, in sequence, resulting in a current base value stored in memory. Unlike compaction, the reading process does not change the based value 606 stored in the database. The current base value in memory is distinct from the base value 606 in the database. When there are no deltas for a data item, there is no work to perform in applying the deltas. As used herein, the operation of "applying deltas to the base value" occurs even when there are no deltas. The process returns (1318) the current base value stored in memory to the client.

Because the read process 1300 reads and applies all of the deltas, the reading time and disk space usage for the deltas will increase over time. Therefore, preferred embodiments utilize a compaction process 1200 as described above, which merges deltas into the corresponding base values, which reduces both disk space usage and the time required to read data items.

FIGS. 14C and 14D provide exemplary data structures for ingress maps 136. Ingress maps 136 identify deltas that have been received at an instance from other instances. The ingress map shown in FIG. 14D is a typical map for use in a database. Each record in the ingress map of FIG. 14D represents a single delta. The ingress map includes the source instance 1428, which specifies the original source of the delta. As described above with respect to replication, transmissions may be forwarded from one instance to another, so a delta need not be received from the instance where the delta was created. The ingress map tracks the original instance. Optionally, some embodiments also track the instance that transmitted the delta to the current instance.

The ingress map also includes a row identifier 1430, which specifies the row to which the delta applies, and a sequence identifier 1432, which is globally unique and specifies the order in which the deltas are to be applied. In general, an instance is not aware of deltas created at other instances until the deltas are received, so presence of a record in the ingress table indicates receipt of the delta. In alternative embodiments, the ingress table includes a field such as "received" to indicate that the delta has been received. For large scale distributed databases, the ingress map of FIG. 14D is inefficient both in its use of disk space and in the time required to insert a very large number of records. Therefore, in preferred embodiments, an ingress map has a data structure similar to the one illustrated in FIG. 14C.

The ingress map in FIG. 14C specifies two dimensional rectangles of deltas, so each individual record identifies a very large set of deltas. In one dimension, each record in the ingress map specifies a start row 1420 and an end row 1422, which specifies a contiguous range of row identifiers. In a second dimension, the ingress map in FIG. 14C specifies a start sequence 1424 and an end sequence 1426, which creates a contiguous range of sequence identifiers. In some embodiments, deltas are included in the sequence range if a delta has a sequence identifier greater than or equal to the start sequence and less than or equal to the end sequence. In other embodiments, there is a strict inequality on the upper end, so that deltas are included only when the sequence identifier is strictly less than the end sequence. (The strict inequality could also be placed on the lower end.) In these latter embodiments, the start sequence 1424 of one record is equal to the end sequence of the previous record. In still other embodiments, records in the ingress table do not specify a start sequence 1424, making the assumption that the starting sequence for one record is the end sequence of the previous record. In some embodiments, the ingress table includes an identifier of the source instance. In other embodiments, there is a separate ingress table for each other instance, so the source instance need not be saved in the table.

An ingress map may be used in the compaction process to identify which deltas have been received from other instances. In some embodiments, the sets of row identifiers used in transmissions and compaction are the same, and are contiguous ranges that are reused. See FIGS. 15A-15B and the associated discussion below. Because the same start row 1420 and end row 1422 are reused, the compaction process can read the ingress records for these start and end rows, and determine if there are any sequence gaps. This is illustrated in FIG. 17.

FIGS. 15A and 15B illustrate a process for developing a plan to transmit deltas to other instances in an efficient manner according to some embodiments. In these embodiments, a range of row identifiers is selected, beginning with transmission start row 1504 and ending with transmission end row 1506. In some embodiments, the transmission start row 1504 and end row 1506 match the start row 1404 and end row 1406 used in the egress maps 1516-2 and 1516-3. In addition to the selection of row identifiers, the process determines the highest sequence identifier 1514 that has been used for any deltas at the first instance. At this point, all deltas within the transmission rectangle 1518 should be sent to the other instances.

Because many of the deltas have already been transmitted to other instances (and acknowledged as received), the actual transmission matrices (also known as Shapes to Send) are much smaller. The egress maps 1516-2 and 1516-3 identify which deltas have already been transmitted and acknowledged, so the deltas in each egress map are "subtracted" from the transmission rectangle 1518 to create the transmission matrices 1508-2 and 1508-3 for each of the other instances. As illustrated in FIG. 15A, the egress map 1516-3 includes individual egress records 1510-1, 1510-2, 1510-3, etc., which jointly identify the deltas already sent to instance 3 and acknowledged. The egress records are stored in an egress table 134 such as the one illustrated in FIG. 14C. Subtracting the individual egress records 1510-1, etc. from transmission rectangle 1518 yields transmission matrix 1508-3.

The egress map 1516-2 to instance 2 is a little different in the illustration because there is a notch 1520 of deltas that have not been acknowledged as received at instance 2. This may occur, for example, when the start row 1504 and end row 1506 for the transmission do not match the start row 1404 and end row 1406 of records in the egress map. The transmission matrix 1508-2 for instance 2 is thus not a simple rectangle. The original transmission plan 1512-1 is thus to transmit matrix A 1508-2 to instance 2 and transmit matrix B 1508-3 to instance 3. In some instances, this transmission plan will be used. However, other transmission plans are contemplated, and the costs for each of the transmission plans are compared. In this context, "costs" come in many forms: the actual dollar cost for use of certain bandwidth, the opportunity cost for using bandwidth that could have been used for another process, the risk associated with network links (which could incur other costs to retransmit or resolve), the cost in time it takes to transmit deltas to other instances, etc.

To investigate other transmission plans, several set theoretic operations are performed on the transmission matrices A 1508-2 and B 1508-3. In some embodiments, difference A−B 1508-4 and difference B−A 1508-5 are computed. In the example illustrated in FIGS. 15A and 15B, A−B is a small transmission matrix C 1508-4, and B−A is the empty set 1508-5. In some embodiments, the intersection A∩B 1508-6 is computed, which in this case yields a large revised transmission matrix D. Transmission matrix C 1508-4 only needs to go to instance 2, but transmission matrix D 1508-6 needs to go to instance 2 and instance 3. If the cost of transmitting data between instance 2 and instance 3 is lower than the cost of transmitting data from instance I to instance 3, then a good option is transmission plan 1512-2, which transmits the deltas for matrix D 1508-6 to instance 2, which incorporates the data and forwards the deltas for matrix D to instance 3. The deltas for matrix C 1508-4 are transmitted only to instance 2. A simple cost analysis example is illustrated in FIG. 16, described above.

Because the data in matrix D 1506 must go to instance 2 and instance 3 in the illustration, an alternative transmission plan 1512-4 sends the deltas for matrix D 1508-6 to instance 3, which incorporates the deltas and transmits them to instance 2. This alternative transmission plan may be more cost effective if the cost of bandwidth directly from instance 1 to instance 2 is more costly than bandwidth from instance 1 to instance 3. In some embodiments, "over-transmission" is permitted, as illustrated in transmission plan 1512-3. In this transmission plan, transmission matrix A 1508-2 is sent to instance 2 (as needed), then transmitted to instance 3, even though it contains an extra portion of deltas that are already at the third instance. Generally, intentional over-transmission of deltas is undesirable, but if the over-transmission is small and there are sufficient other benefits to the transmission plan, it may be a good option.

Figure 17:
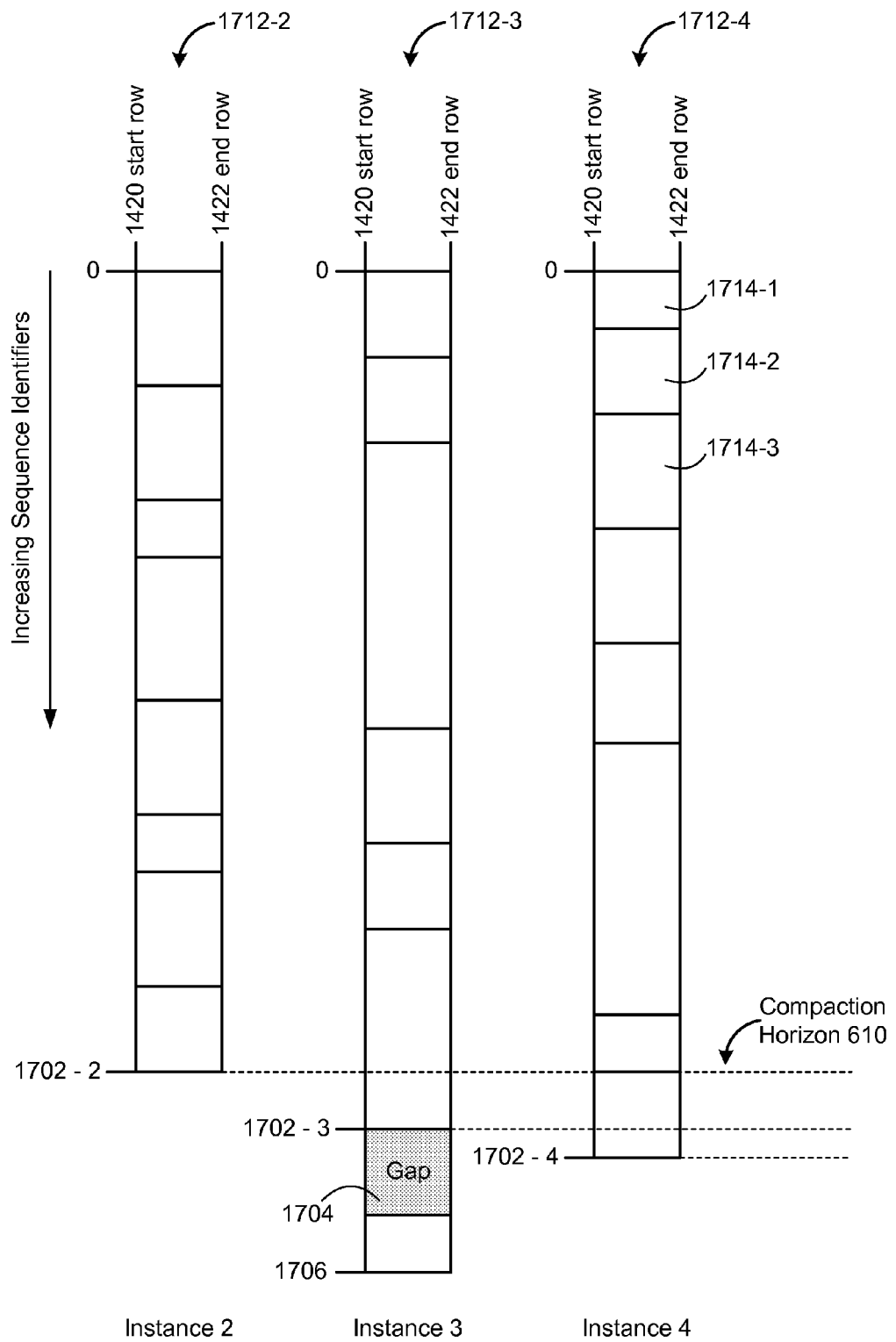
FIG. 17 illustrates a method of determining a compaction horizon using ingress maps according to some embodiments.

FIG. 17 illustrates how ingress maps 1712-2, 1712-3, and 1712-4 at instance 1 may be used in compaction operation 1222. Ingress map 1712-2 identifies deltas received from instance 2, and so on. In some embodiments, the ingress maps all use the same ranges of row identifiers, as depicted by start row 1420 and end row 1422 in FIG. 17. In other embodiments, or under certain circumstances, different ranges may be used. In fact, different ranges may be used even within a single ingress map 136. Each rectangle in an egress map, such as rectangles 1714-1, 1714-2, and 1714-3 in ingress map 1712-4, identifies a batch of deltas that was received. Typically, received batches arrive in order as illustrated by ingress records 1714-1, 1714-2, and 1714-3. In some embodiments, the start sequence of one batch is the end sequence of the previous batch. In these embodiments, deltas are included in a batch if there sequence identifiers are strictly greater than the start sequence and less than or equal to the end sequence. In other embodiments, the ingress map table saves only the ending sequence, and each batch includes deltas that have sequence identifiers greater than the previous end sequence. In some rare circumstances there are gaps in the ingress map as illustrated by gap 1704 for ingress map 1712-3 in FIG. 17. The gap 1704 shows a range of sequence identifiers that have not yet been received from instance 3.

To calculate a compaction horizon 610, the largest received sequence identifier for each instance is determined. For instance 2, the highest received sequence identifier is 1702-2, which is the end sequence of the most recent transmission from instance 2. For instance 4, the highest received sequence identifier is 1702-4, which is the end sequence of the most recent transmission from instance 4. For instance 3, the highest sequence identifier received is 1706 from the most recent transmission, but the gap 1704 prevents compaction beyond point 1702-3, which represent the highest usable sequence identifier. The sequence identifiers 1702-2, 1702-3, and 1702-4 identify the highest usable sequence identifiers for each individual instance, so the compaction horizon cannot be greater than any of these values. For example, there may be deltas at instance 2 with sequence identifiers greater than 1702-2, so the compaction horizon cannot be greater than the sequence identifier at 1702-2. Therefore, the compaction horizon is less than or equal to min (1702-2, 1702-3, 1702-4). In the example illustrated in FIG. 17, the minimum of these is 1702-2, so the compaction horizon is at most the sequence identifier at 1702-2. Of course the compaction horizon is also limited based on what deltas have been transmitted from instance 1 to the other instances.

In some embodiments, a process analogous to the process just described for using ingress maps in the calculation of a compaction horizon also applies to the use of egress maps. This is operation 1220 in FIG. 12B. For each instance other than the current instance, a maximum sequence identifier is determined, and the compaction horizon is limited by each of these. This is similar to the compaction horizon being limited to the sequence identifiers 1702-2, 1702-3, and 1702-4 in the ingress maps.

In the embodiments just described, deltas with sequence identifiers less than or equal to the compaction horizon are merged with the corresponding base values. In alternative embodiments, the deltas are merged only when their sequence identifiers are strictly less than the compaction horizon. In these embodiments, the compaction horizon is selected slightly differently. Specifically, the compaction horizon is selected to be a sequence identifier S such that, for all S'<S, (a) Every delta for relevant entries with sequence identifier S' has been transmitted to every other instance that potentially has an interest in these entries (and the other instances have acknowledged receipt of the deltas), and (b) There is certainty that no delta will ever arrive in the future for one of these relevant entries with sequence identifier S'. In particular, (1) no delta with such a sequence identifier will be created at the current instance, and (2) all deltas for the relevant entries with sequence identifier S' have already been received locally and been acknowledged.

The manner of ensuring these conditions depends on the implementation. In some embodiments, where sequencer identifiers are assigned by a blobmaster 204, the compaction horizon S can be calculated using "first missing sequence identifiers" in the ingress maps 136 and egress maps 134. Some embodiments define a function called 'FirstMissingSequencer', which returns the least sequence identifier S that is not an element of an ingress or egress map. In this way, condition (a) is satisfied if S<=the first missing sequence identifier for each egress map. Condition (b)(2) is satisfied if S<=the first missing sequence identifier for each ingress map. And (b)(1) follows from (a) because the sequence identifiers generated at an instance are monotonically increasing. Therefore, the minimum of the various first missing sequencer identifiers provides an exemplary compaction horizon. One of ordinary skill in the art would recognize that other embodiments could compute the compaction horizon differently.

FIGS. 18A-18E illustrate data structures that are used to store metadata in some embodiments. In some embodiments, these data structures exist within the memory space of an executing program or process. In other embodiments, these data structures exist in non-volatile memory, such as magnetic or optical disk drives. In some embodiments, these data structures form a protocol buffer, facilitating transfer of the structured data between physical devices or processes. See, for example, the Protocol Buffer Language Guide, available at http://code.google.com/apis/protocolbuffers/docs/proto.html.

The overall metadata structure 1802 includes three major parts: the data about blob generations 1804, the data about blob references 1808, and inline data 1812. In some embodiments, read tokens 1816 are also saved with the metadata, but the read tokens are used as a means to access data instead of representing characteristics of the stored blobs.

The blob generations 1804 can comprise one or more "generations" of each blob. In some embodiments, the stored blobs are immutable, and thus are not directly editable. Instead, a "change" of a blob is implemented as a deletion of the prior version and the creation of a new version. Each of these blob versions 1806-1, 1806-2, etc. is a generation, and has its own entry. In some embodiments, a fixed number of generations are stored before the oldest generations are physically removed from storage. In other embodiments, the number of generations saved is set by a blob policy 326. (A policy can set the number of saved generations as 1, meaning that the old one is removed when a new generation is created.) In some embodiments, removal of old generations is intentionally "slow," providing an opportunity to recover an old "deleted" generation for some period of time. The specific metadata associated with each generation 1806 is described below with respect to FIG. 18B.

Blob references 1808 can comprises one or more individual references 1810-1, 1810-2, etc. Each reference is an independent link to the same underlying blob content, and each reference has its own set of access information. In most cases there is only one reference to a given blob. Multiple references can occur only if the user specifically requests them. This process is analogous to the creation of a link (a hard link) in a desktop file system. The information associated with each reference is described below with respect to FIG. 18C.

Inline data 1812 comprises one or more inline data items 1814-1, 1814-2, etc. Inline data is not "metadata"—it is the actual content of the saved blob to which the metadata applies. For blobs that are relatively small, access to the blobs can be optimized by storing the blob contents with the metadata. In this scenario, when a client asks to read the metadata, the blobmaster returns the actual blob contents rather than read tokens 1816 and information about where to find the blob contents. Because blobs are stored in the metadata table only when they are small, there is generally at most one inline data item 1814-1 for each blob. The information stored for each inline data item 1814 is described below in FIG. 18D.

Figure 18A:
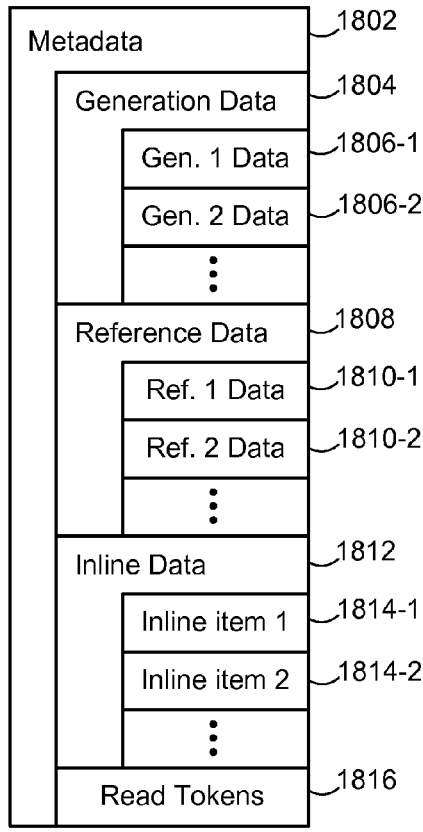
FIGS. 18A-18E illustrate data structures used to store metadata according to some embodiments.
Figure 18B:
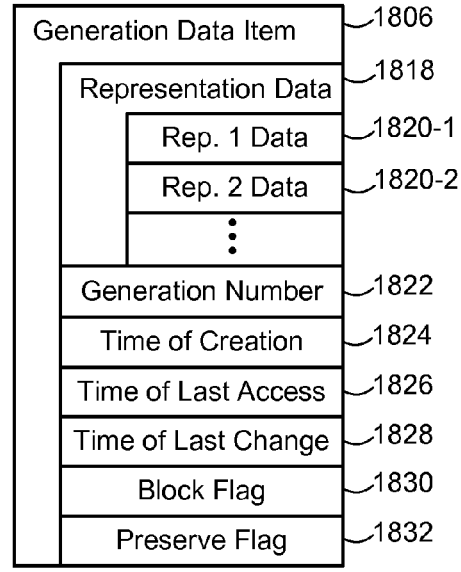

As illustrated in the embodiment of FIG. 18B, each generation 1806 includes several pieces of information. In some embodiments, a generation number 1822 (or generation ID) uniquely identifies the generation. The generation number can be used by clients to specify a certain generation to access. In some embodiments, if a client does not specify a generation number, the blobmaster 204 will return information about the most current generation. In some embodiments, each generation tracks several points in time. Specifically, some embodiments track the time the generation was created (1824). Some embodiments track the time the blob was last accessed by a user (1826). In some embodiments, last access refers to end user access, and in other embodiments, last access includes administrative access as well. Some embodiments track the time the blob was last changed (1828). In some embodiments that track when the blob was last changed, changes apply only to metadata because the blob contents are immutable. Some embodiments provide a block flag 1830 that blocks access to the generation. In these embodiments, a blobmaster 204 would still allow access to certain users or clients who have the privilege or seeing blocked blob generations. Some embodiments provide a preserve flag 1832 that will guarantee that the data in the generation is not removed. This may be used, for example, for data that is subject to a litigation hold or other order by a court. In addition to these individual pieces of data about a generation, a generation has one or more representations 1818. The individual representations 1820-1, 1820-2, etc. are described below with respect to FIG. 18E.

Figure 18D:
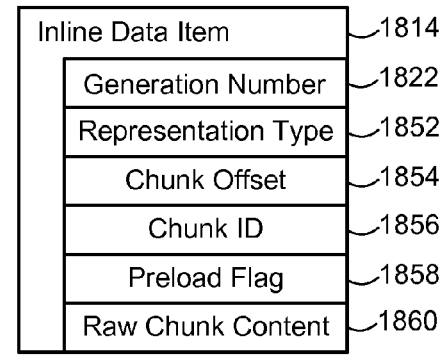
Figure 18C:
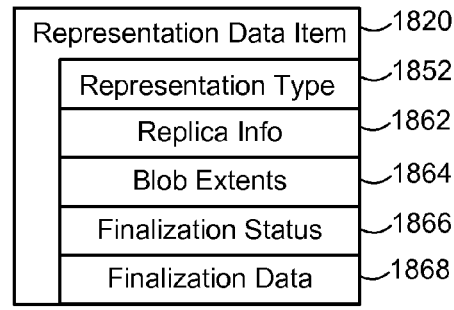

FIG. 18C illustrates a data structure to hold an individual reference according to some embodiments. Each reference 1810 includes a reference ID 1834 that uniquely identifies the reference. When a user 302 accesses a blob, the user application 308 must specify a reference ID in order to access the blob. In preferred embodiments, each reference has an owner 1836, which may be the user or process that created the reference. Each reference has its own access control list ("ACL"), which may specify who has access to the blob, and what those access rights are. For example, a group that has access to read the blob may be larger than the group that may edit or delete the blob. In some embodiments, removal of a reference is intentionally slow, in order to provide for recovery from mistakes. In some embodiments, this slow deletion of references is provided by tombstones. Tombstones may be implemented in several ways, including the specification of a tombstone time 1840, at which point the reference will be truly removed. In some embodiments, the tombstone time is 30 days after the reference is marked for removal. In preferred embodiments, certain users or accounts with special privileges can view or modify references that are already marked with a tombstone, and have the rights to remove a tombstone (i.e., revive a blob).

In some embodiments, each reference has its own blob policy, which may be specified by a policy ID 1842. The blob policy specifies the number of copies of the blob, where the copies are located, what types of data stores to use for the blobs, etc. When there are multiple references, the applicable "policy" is the union of the relevant policies. For example, if one policy requests 2 copies, at least one of which is in Europe, and another requests 3 copies, at least one of which is in North America, then the minimal union policy is 3 copies, with at least one in Europe and at least one in North America. In some embodiments, individual references also have a block flag 1844 and preserve flag 1846, which function the same way as block and preserve flags 1830 and 1832 defined for each generation. In addition, a user or owner of a blob reference may specify additional information about a blob, which may include on disk information 1850 or in memory information 1848. A user may save any information about a blob in these fields.

FIG. 18D illustrates inline data items 1814 according to some embodiments. Each inline data item 1814 is assigned to a specific generation, and thus includes a generation number 1822. The inline data item also specifies the representation type 1852, which, in combination with the generation number 1822, uniquely identifies a representation item 1820. (See FIG. 18E and associated description below.) In embodiments that allow multiple inline chunks for one blob, the inline data item 1814 also specifies the chunk ID 1856. In some embodiments, the inline data item 1814 specifies the chunk offset 1854, which specifies the offset of the current chunk from the beginning of the blob. In preferred embodiments, the chunk offset is specified in bytes. In some embodiments, there is a Preload Flag 1858 that specifies whether the data on disk is preloaded into memory for faster access. The contents 1860 of the inline data item 1814 are stored with the other data elements.

Figure 18E:
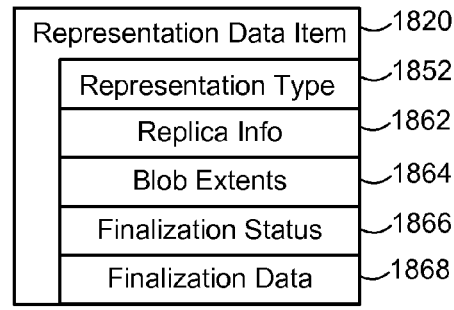

FIG. 18E illustrates a data structure to store blob representations according to some embodiments. Representations are distinct views of the same physical data. For example, one representation of a digital image could be a high resolution photograph. A second representation of the same blob of data could be a small thumbnail image corresponding to the same photograph. Each representation data item 1820 specifies a representation type 1852, which would correspond to "high resolution photo" and "thumbnail image" in the above example. The Replica Information 1862 identifies where the blob has been replicated, the list of storage references (i.e., which chunk stores have the chunks for the blob). In some embodiments, the Replica Information 1862 includes other auxiliary data needed to track the blobs and their chunks. Each representation data item also includes a collection of blob extents 1864, which specify the offset to each chunk within the blob, to allow reconstruction of the blob.

When a blob is initially created, it goes through several phases, and some embodiments track these phases in each representation data item 1820. In some embodiments, a finalization status field 1866 indicates when the blob is UPLOADING, when the blob is FINALIZING, and when the blob is FINALIZED. Most representation data items 1820 will have the FINALIZED status. In some embodiments, certain finalization data 1868 is stored during the finalization process.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of replicating data for a distributed database between a plurality of instances, each instance comprising one or more server computers with memory and one or more processors, the method comprising:
   identifying a first instance of the distributed database at a first geographic location;
   identifying a second instance of the distributed database at a second geographic location;
   tracking changes to the distributed database at the first instance by storing deltas, each delta having a row identifier that identifies a piece of data modified, a sequence identifier that specifies an order in which the delta is applied to the second instance, and an instance identifier that specifies an instance where the delta was created;
   determining which deltas are to be sent to the second instance using a second egress map at the first instance, wherein the second egress map specifies which combinations of row identifier and sequence identifier have been acknowledged as received at the second instance;
   building a second transmission matrix for the second instance that identifies deltas that have not yet been acknowledged as received at the second instance;
   transmitting deltas identified in the second transmission matrix to the second instance;
   receiving acknowledgement that transmitted deltas have been incorporated in the second instance; and
   updating the second egress map to indicate acknowledged deltas.

2. The method of claim 1, further comprising:
   identifying a third instance of the distributed database at a third geographic location distinct from the first and second geographic locations;
   determining which deltas are to be sent to the third instance using a third egress map at the first instance, wherein the third egress map specifies which combinations of row identifier and sequence identifier have been acknowledged as received at the third instance;
   building a third transmission matrix for the third instance that identifies deltas that have not yet been acknowledged as received at the third instance;
   modifying the transmission matrices for the second and third instances to form one or more revised transmission matrices, wherein deltas identified in each revised transmission matrix are transmitted to a respective location to update the instance at the respective location, and deltas identified in at least one of the revised transmission matrices are transmitted to the second location for subsequent transmission from the second location to the third location;
   receiving acknowledgement that deltas transmitted to the third instance, either directly or indirectly via the second instance, have been incorporated in the third instance; and
   updating the third egress map to indicate acknowledged deltas.

3. The method of claim 2, including assigning a cost for transmissions between pairs of geographic locations, and wherein modifying the transmission matrices includes an analysis of the total cost for transmitting the deltas to the second and third geographic locations.

4. The method of claim 2, wherein modifying the transmission matrices includes determining bandwidth availability between geographic locations of the instances.

5. The method of claim 2, wherein the transmission matrices for the second and third instances are the same, there is only one revised transmission matrix, the one revised transmission matrix is the same as the transmission matrices, and deltas identified in the revised transmission matrix are transmitted to the second geographic location for subsequent transmission to the third geographic location.

6. The method of claim 1, wherein each sequence identifier comprises a timestamp and a unique tie breaker value that is assigned based on hardware and/or software at each instance of the distributed database.

7. The method of claim 1, wherein the second geographic location is distinct from the first geographic location.

8. A server system, comprising a plurality of servers, each server having:
one or more processors;
memory; and
one or more programs stored in the memory for execution by the one or more processors, the one or more programs comprising instructions for:
identifying a first instance of the distributed database at a first geographic location;
identifying a second instance of the distributed database at a second geographic location;
tracking changes to the distributed database at the first instance by storing deltas, each delta having a row identifier that identifies a piece of data modified, a sequence identifier that specifies an order in which the delta is applied to the second instance, and an instance identifier that specifies an instance where the delta was created;
determining which deltas are to be sent to the second instance using a second egress map at the first instance, wherein the second egress map specifies which combinations of row identifier and sequence identifier have been acknowledged as received at the second instance;
building a second transmission matrix for the second instance that identifies deltas that have not yet been acknowledged as received at the second instance;
transmitting deltas identified in the second transmission matrix to the second instance;
receiving acknowledgement that transmitted deltas have been incorporated in the second instance; and
updating the second egress map to indicate acknowledged deltas.

9. The server system of claim 8, further comprising instructions for:
identifying a third instance of the distributed database at a third geographic location distinct from the first and second geographic locations;
determining which deltas are to be sent to the third instance using a third egress map at the first instance, wherein the third egress map specifies which combinations of row identifier and sequence identifier have been acknowledged as received at the third instance;
building a third transmission matrix for the third instance that identifies deltas that have not yet been acknowledged as received at the third instance;
modifying the transmission matrices for the second and third instances to form one or more revised transmission matrices, wherein deltas identified in each revised transmission matrix are transmitted to a respective location to update the instance at the respective location, and deltas identified in at least one of the revised transmission matrices are transmitted to the second location for subsequent transmission from the second location to the third location;
receiving acknowledgement that deltas transmitted to the third instance, either directly or indirectly via the second instance, have been incorporated in the third instance; and
updating the third egress map to indicate acknowledged deltas.

10. The server system of claim 9, wherein the transmission matrices for the second and third instances are the same, there is only one revised transmission matrix, the one revised transmission matrix is the same as the transmission matrices, and deltas identified in the revised transmission matrix are transmitted to the second geographic location for subsequent transmission to the third geographic location.

11. A computer readable storage medium storing one or more programs configured for execution by a server computer system having one or more processors and memory storing one or more programs for execution by the one or more processors, the one or more programs comprising instructions to:
identify a first instance of the distributed database at a first geographic location;
identify a second instance of the distributed database at a second geographic location;
track changes to the distributed database at the first instance by storing deltas, each delta having a row identifier that identifies a piece of data modified, a sequence identifier that specifies an order in which the delta is applied to the second instance, and an instance identifier that specifies an instance where the delta was created;
determine which deltas are to be sent to the second instance using a second egress map at the first instance, wherein the second egress map specifies which combinations of row identifier and sequence identifier have been acknowledged as received at the second instance;
build a second transmission matrix for the second instance that identifies deltas that have not yet been acknowledged as received at the second instance;
transmit deltas identified in the second transmission matrix to the second instance;
receive acknowledgement that transmitted deltas have been incorporated in the second instance; and
update the second egress map to indicate acknowledged deltas.

12. The computer readable storage medium of claim 11, further comprising instructions to:
identify a third instance of the distributed database at a third geographic location distinct from the first and second geographic locations;
determine which deltas are to be sent to the third instance using a third egress map at the first instance, wherein the third egress map specifies which combinations of row identifier and sequence identifier have been acknowledged as received at the third instance;
build a third transmission matrix for the third instance that identifies deltas that have not yet been acknowledged as received at the third instance;
modify the transmission matrices for the second and third instances to form one or more revised transmission matrices, wherein deltas identified in each revised transmission matrix are transmitted to a respective location to update the instance at the respective location, and deltas identified in at least one of the revised transmission matrices are transmitted to the second location for subsequent transmission from the second location to the third location;

receive acknowledgement that deltas transmitted to the third instance, either directly or indirectly via the second instance, have been incorporated in the third instance; and update the third egress map to indicate acknowledged deltas.

13. The computer readable storage medium of claim 12, wherein the transmission matrices for the second and third instances are the same, there is only one revised transmission matrix, the one revised transmission matrix is the same as the transmission matrices, and deltas identified in the revised transmission matrix are transmitted to the second geographic location for subsequent transmission to the third geographic location.

* * * * *